United States Patent
Murakami

(10) Patent No.: US 8,991,571 B2
(45) Date of Patent: Mar. 31, 2015

(54) HYDRAULIC SHOCK ABSORBER

(75) Inventor: Yosuke Murakami, Shizuoka (JP)

(73) Assignee: Showa Corporation, Saitama (JP)

(*) Notice: Subject to any disclaimer, the term of this patent is extended or adjusted under 35 U.S.C. 154(b) by 468 days.

(21) Appl. No.: 13/243,175

(22) Filed: Sep. 23, 2011

(65) Prior Publication Data
US 2012/0247890 A1 Oct. 4, 2012

(30) Foreign Application Priority Data
Mar. 30, 2011 (JP) ................................ 2011-076079

(51) Int. Cl.
*F16F 9/516* (2006.01)
*F16F 9/32* (2006.01)
*F16F 9/49* (2006.01)

(52) U.S. Cl.
CPC .... *F16F 9/32* (2013.01); *F16F 9/49* (2013.01)
USPC ..................... 188/289; 188/322.14

(58) Field of Classification Search
CPC ....................................................... F16F 9/486
USPC .................. 188/322.14, 289, 322.13, 322.15, 188/322.22
See application file for complete search history.

(56) References Cited

U.S. PATENT DOCUMENTS

| 2,224,306 | A | * | 12/1940 | Krueger | 267/64.22 |
| 3,385,589 | A | * | 5/1968 | Erdmann | 267/34 |
| 4,010,829 | A | * | 3/1977 | Naito et al. | 188/278 |
| 6,978,871 | B2 | * | 12/2005 | Holiviers | 188/266.6 |
| 7,441,640 | B2 | * | 10/2008 | Russell | 188/322.15 |
| 8,511,447 | B2 | * | 8/2013 | Nowaczyk et al. | 188/315 |
| 2010/0059321 | A1 | * | 3/2010 | Boivin | 188/284 |
| 2010/0326780 | A1 | * | 12/2010 | Murakami | 188/322.13 |

FOREIGN PATENT DOCUMENTS

| JP | 3922646 | 10/1939 |
| JP | 2001263409 | 9/2001 |
| JP | 2011-027255 A | 2/2011 |

* cited by examiner

*Primary Examiner* — Bradley King
(74) *Attorney, Agent, or Firm* — Keith Orum; Orum & Roth LLC

(57) ABSTRACT

In a hydraulic shock absorber, a damping force generating device provided between a piston side oil chamber of a cylinder and a rod side oil chamber is provided with a through-hole which communicates the piston side oil chamber of the cylinder with the rod side oil chamber of the cylinder via an outer flow path of the cylinder. A leading end portion of a piston rod is provided with a needle which can come in and out of the through-hole of the damping force generating device, and an opening degree of the through-hole can be varied by the needle according to a forward and backward position of the piston rod with respect to the oil chamber of the cylinder.

8 Claims, 9 Drawing Sheets

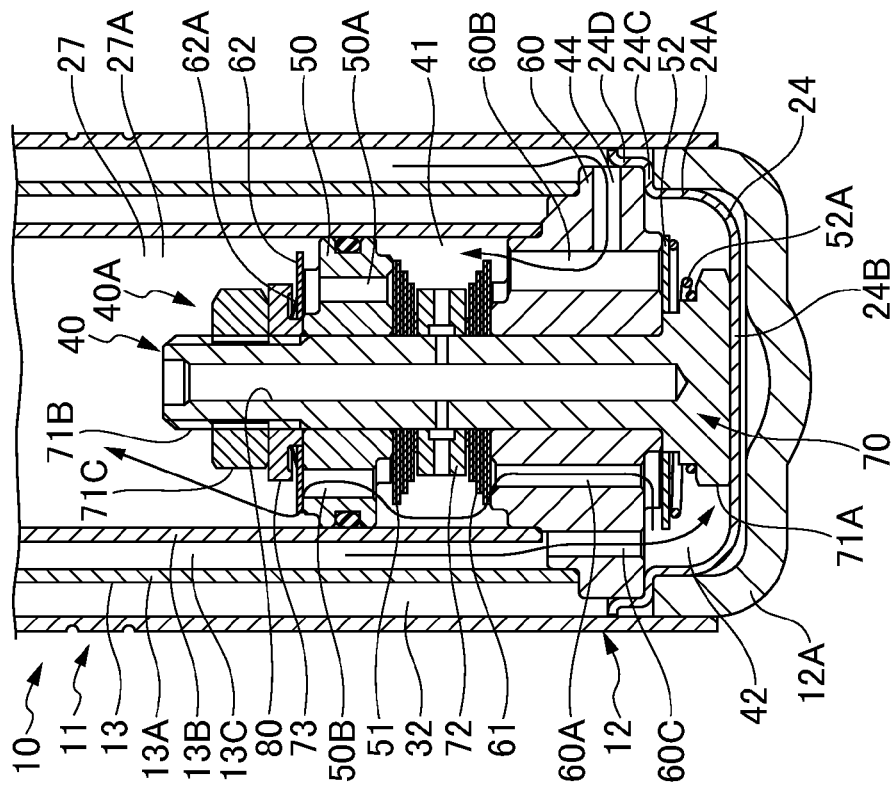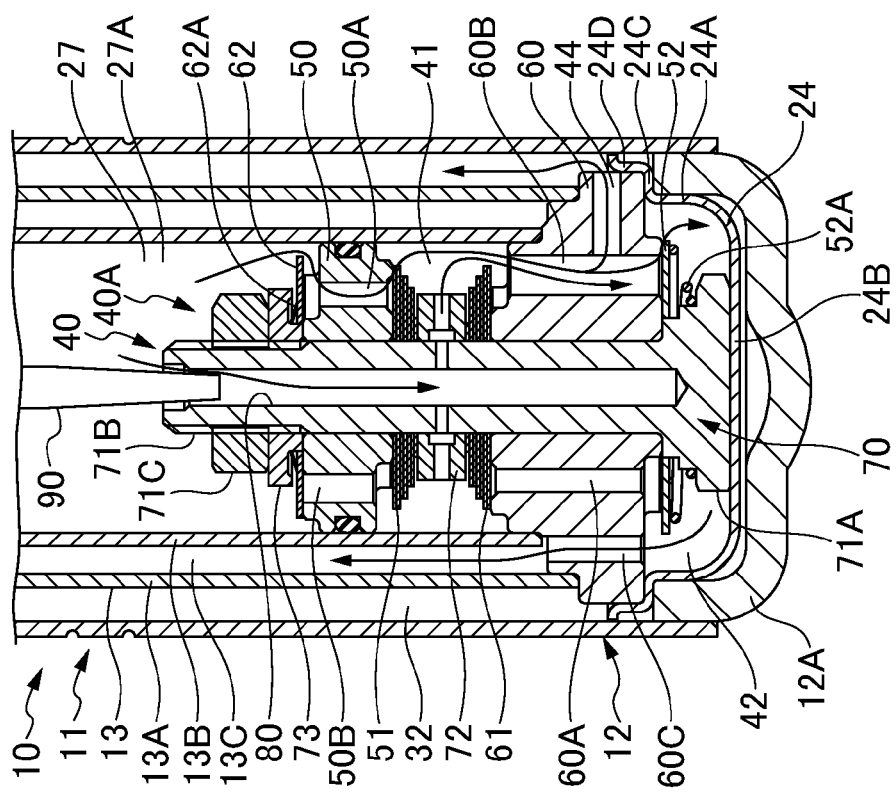

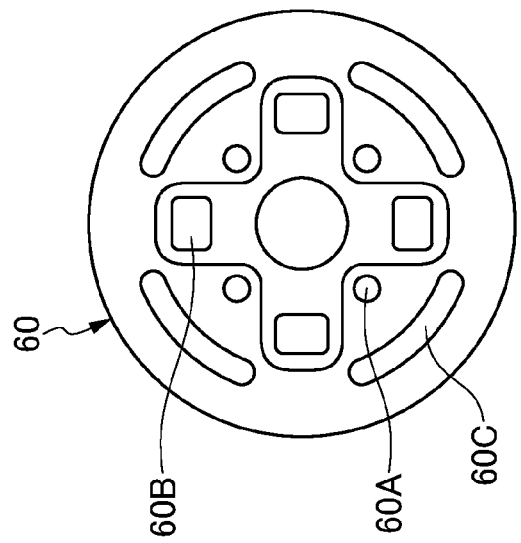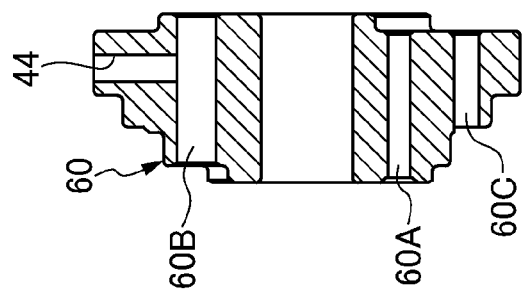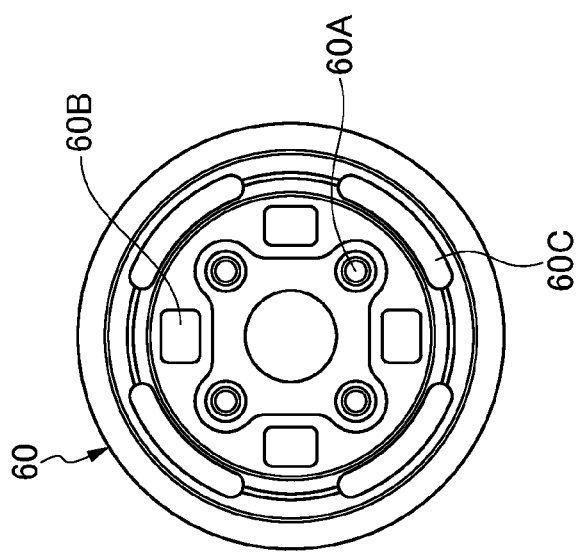

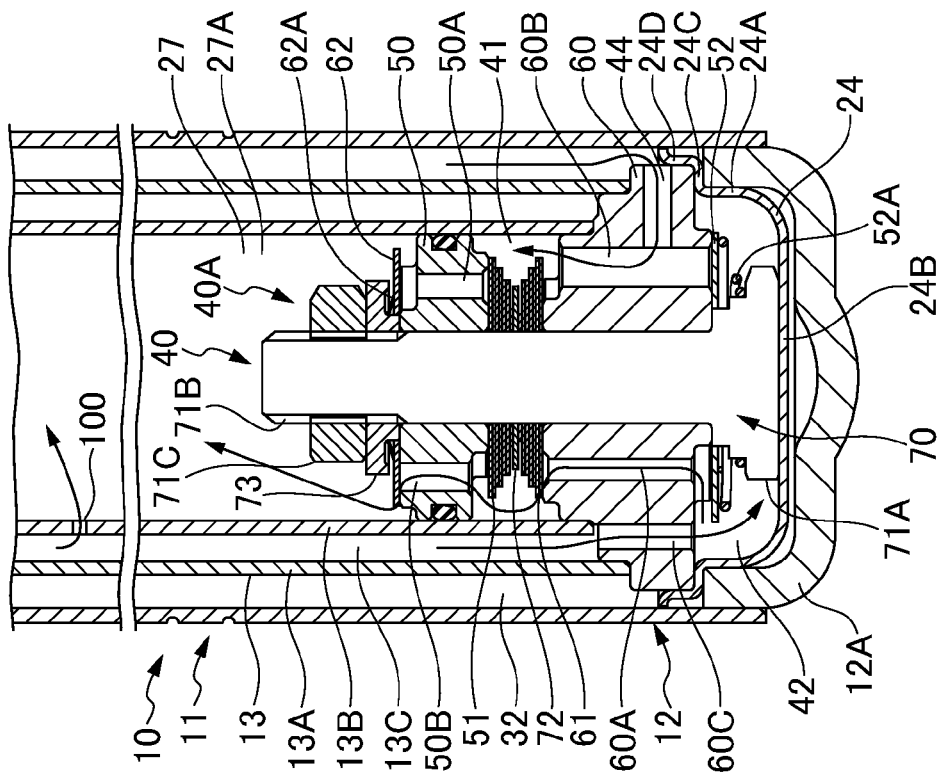
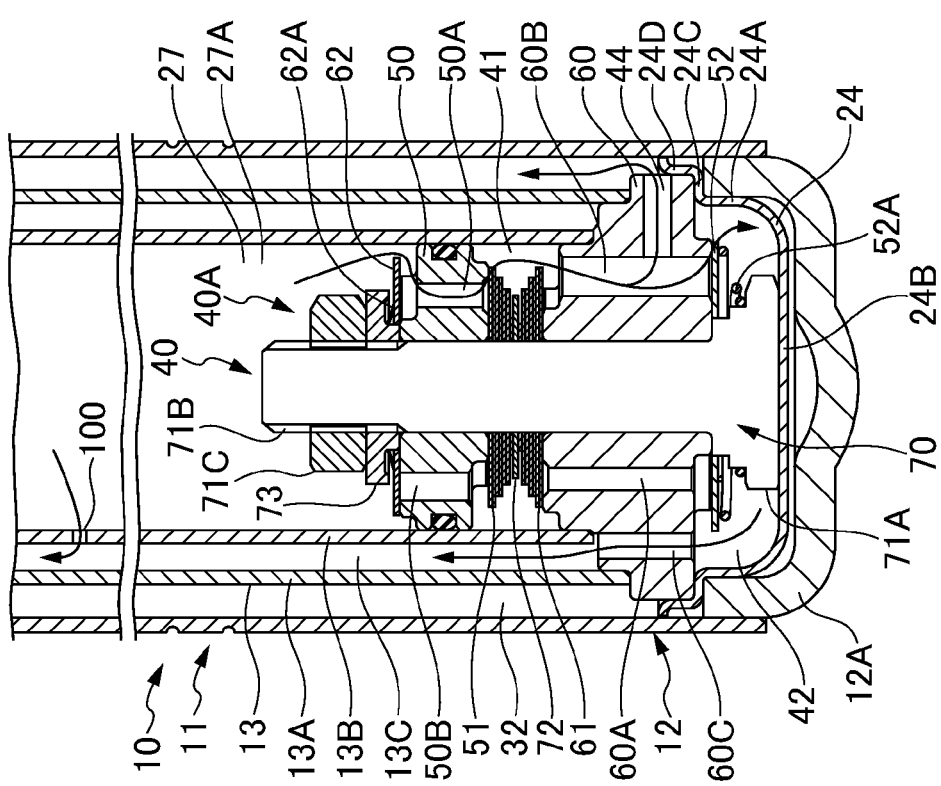

HYDRAULIC SHOCK ABSORBER

BACKGROUND OF THE INVENTION

1. Field of the Invention

The present invention relates to a hydraulic shock absorber.

2. Description of the Related Art

Generally, in a hydraulic shock absorber, there has been provided a structure in which into an oil chamber of a cylinder attached to one of a vehicle body side and an axle side, a piston rod attached to the other of the vehicle body side and the axle side is inserted. The oil chamber of the cylinder is divided into a piston side oil chamber and a rod side oil chamber by a piston provided in a leading end portion of the piston rod, and an oil reservoir chamber compensating a volumetric capacity of the piston rod moving forward and backward to the oil chamber of the cylinder is communicated with the oil chamber of the cylinder.

Further, a hydraulic shock absorber described in Japanese Patent Application Laid-Open (JP-A) No. 2001-263409 (Patent Document 1) is structured such that a piston side oil chamber and an oil reservoir chamber are divided by a partition wall member. A compression side damping force generating device is provided in an oil passage communicating the piston side oil chamber and the oil reservoir chamber which are provided in the partition wall member. The partition wall member is provided with a communication passage communicating the piston side oil chamber and the oil reservoir chamber, and the piston rod is provided with a needle which is fitted to the communication passage after the piston rod is compressed at a fixed stroke.

Accordingly, in the hydraulic shock absorber described in Patent Document 1, if the piston rod moves forward to a far side of the oil chamber of the cylinder in a compression side stroke, and the needle provided in the piston rod is fitted to the communication passage of the partition wall member, the communication between the piston rod and the oil reservoir chamber by the communication passage is shut off gradually. Therefore, the oil pressurized by the piston passes through the compression side damping force generating device provided in the partition wall member in large quantities gradually, and the compression side damping force generating device generates a great damping force gradually. In other words, the damping force is changed according to a stroke of the compression side stroke, and a position dependency of the compression side damping force is indicated.

Further, a hydraulic shock absorber described in Japanese Patent Application Publication (JP-B) No. 39-22646 (Patent Document 2) is structured such that a piston side oil chamber and an oil reservoir chamber are divided by a partition wall member, and compression side and extension side damping force generating devices are provided in an oil passage communicating the piston side oil chamber and the oil reservoir chamber which are provided in the partition wall member. Further, through-holes communicating the piston side oil chamber of the cylinder with a rod side oil chamber of the cylinder via a bypass oil passage provided around the cylinder are provided at a plurality of positions in an axial direction of the side wall of the cylinder. Each time when the piston rod extends and retracts at a fixed stroke, the piston opens and closes each of the through holes.

Accordingly, in the hydraulic shock absorber described in Patent Document 2, as the piston rod moves forward to a far side of the oil chamber of the cylinder in a compression side stroke, and the piston provided in the piston rod passes through each of the through-holes provided in the axial direction of the side wall of the cylinder, the through-holes directly communicating the piston side oil chamber with the bypass oil passage are reduced. An amount of oil flowing out to the bypass oil passage and the rod side oil chamber via the through-holes communicating with the oil chamber from the piston side oil chamber is reduced gradually due to a pressure application which the piston applies to the piston side oil chamber. In other words, the amount of oil passing through the compression side damping force generating device of the partition wall member is increased gradually, and the compression side damping force generating device generates a great damping force.

On the other hand, in an extension side stroke in the hydraulic shock absorber described in Patent Document 2, as the piston rod comes out of the far side of the oil chamber of the cylinder, and the piston provided in the piston rod passes through each of the through-holes provided in the axial direction of the side wall of the cylinder, the oil in the rod side oil chamber flows into the piston side oil chamber in large quantities gradually through the passage holes which come to communicate with the piston side oil chamber from the bypass oil passage, due to the pressure application which the piston applies to the rod side oil chamber. In other words, the amount of oil passing through the extension side damping force generating device of the partition wall member is reduced gradually, and the damping force generated by the extension side damping force generating device becomes smaller.

Therefore, in the hydraulic shock absorber described in Patent Document 2, in both the compression side stroke and the extension side stroke, the damping force is changed according to the strokes, and the position dependency of the damping force is indicated.

In the hydraulic shock absorber described in Patent Document 1, the damping force generated by the compression side damping force generating device provided in the partition wall member according to the stroke of the compression side stroke is based on the amount of oil passing through the compression side damping force generating device which is provided in the partition wall member. Further, the amount of oil passing through the compression side damping force generating device which is provided in the partition wall member depends on an annular area obtained by subtracting a cross-sectional area of the needle which is fitted to the communication passage provided in the partition wall member, from a cross-sectional area of the piston rod which goes into the cylinder, and is extremely small. Accordingly, the damping force generated by the compression side damping force generating device which is provided in the partition wall member is small, and it is impossible to obtain a great change of the damping force according to the stroke, by this compression side damping force generating device.

In the hydraulic shock absorber described in Patent Document 2, the damping force generated by the compression side damping force generating device and the extension side damping force generating device which are provided in the partition wall member according to the strokes of the compression side stroke and the extension side stroke, is based on the amount of oil passing through the compression side damping force generating device and the extension side damping force generating device which are provided in the partition wall member. The amount of oil passing through the compression side damping force generating device and the extension side damping force generating device which are provided in the partition wall member depends on a cross-sectional area of the piston rod which goes into and goes out of the cylinder, and is small. Accordingly, the damping force generated by the compression side damping force generating device and the extension side damping force generating device which are provided in the partition wall member is small, and it is impossible to obtain a great change of the damping force according to the stroke by the compression side damping force generating device and the extension side damping force generating device.

In this case, in the hydraulic shock absorbers described in Patent Documents 1 and 2, in order to increase the damping force generated by the compression side damping force generating device or the extension side damping force generating device provided in the partition wall member, and increase the change of the damping force according to the compression side or the extension side stroke of the damping force, it is necessary to increase a resistance of the compression side damping valve constituting the compression side damping force generating device, or the extension side damping valve constituting the extension side damping force generating device. However, in this case, it is necessary to apply a high sealing performance to the cylinder, and there is an inconvenience that a dispersion of the damping force with respect to a piston speed becomes large.

SUMMARY OF THE INVENTION

An object of the present invention is to apply a position dependency to a damping force generated by a compression side damping valve or an extension side damping valve of a damping force generating device, to stably increase the damping force generated by the compression side damping valve or the extension side damping valve easily, and to increase a change of the damping force according to a compression side stroke or an extension side stroke of the damping force, in a hydraulic shock absorber.

In one embodiment of the present invention, there is provided a hydraulic shock absorber comprising: a cylinder, a piston rod, a piston, and an oil reservoir chamber. The cylinder is attached to one of a vehicle body side and an axle side. The piston rod is attached to the other of the vehicle body side and the axle side and is inserted into an oil chamber of the cylinder. The piston is provided in a leading end portion of the piston rod and divides the oil chamber of the cylinder into a piston side oil chamber and a rod side oil chamber. The oil reservoir chamber compensates a volumetric capacity of the piston rod moving forward and backward to the oil chamber of the cylinder, and the oil reservoir chamber is communicated with the oil chamber of the cylinder. A damping force generating device is provided between the piston side oil chamber and the rod side oil chamber of the cylinder. In a compression side stroke, the damping force generating device is provided with a compression side flow path which circulates the oil in the piston side oil chamber of the cylinder from an outer flow path of the cylinder toward the rod side oil chamber. A compression side damping valve is provided in an upstream side of the compression side flow path, and a compression side check valve is provided in a downstream side. An intermediate portion between the compression side damping valve and the compression side check valve in the compression side flow path is communicated with the oil reservoir chamber. In an extension side stroke, the damping force generating device is provided with an extension side flow path which circulates the oil in the rod side oil chamber of the cylinder from the outer flow path of the cylinder toward the piston side oil chamber. An extension side damping valve is provided in an upstream side of the extension side flow path, and an extension side check valve is provided in a downstream side. An intermediate portion between the extension side damping valve and the extension side check valve in the extension side flow path is communicated with the oil reservoir chamber. The damping force generating device is provided with a through-hole which communicates the piston side oil chamber of the cylinder with the rod side oil chamber of the cylinder via the outer flow path of the cylinder. A leading end portion of the piston rod is provided with a needle capable of coming in and out of the through-hole of the damping force generating device, and an opening degree of the through-hole is variable by the needle according to a forward and backward position of the piston rod with respect to the oil chamber of the cylinder.

In one embodiment of the present invention, there is provided the hydraulic shock absorber wherein the damping force generating device is fixedly provided with first and second base pistons around a bolt. The first base piston is provided with a compression side flow path which is opened and closed by the compression side damping valve, and an extension side flow path which is opened and closed by the extension side check valve. The second base piston is provided with a compression side flow path which is opened and closed by the compression side check valve, and an extension side flow path which is opened and closed by the extension side damping valve, and the bolt is provided with the through-hole.

In another embodiment of the present invention, there is provided a hydraulic shock absorber wherein the cylinder consists of an outer tube and an inner tube, and the damping force generating device is embedded by being inserted and attached into an inner periphery of each of lower ends of the outer tube and the inner tube of the cylinder, in a valve unit state in which the first and second base pistons are fixedly provided around the bolt.

In another embodiment of the present invention, there is provided a hydraulic shock absorber wherein the valve unit of the damping force generating device is loaded with the compression side check valve, the second base piston, the extension side damping valve, a valve stopper, the compression side damping valve, the first base piston, the extension side check valve, and another valve stopper in a skewered manner in this order from a side of a head portion of the bolt, on an outer periphery of a rod-like thread portion of the bolt, and they are immobilized by a nut which is screwed into the rod-like thread portion.

In another embodiment of the present invention, there is provided a hydraulic shock absorber wherein the through-hole is provided in the bolt which constitutes the valve unit of the damping force generating device. The through-hole comprises: a vertical hole which is pierced on a center axis of the rod-like thread portion of the bolt from an opposite side to the head portion and is formed so as to be open in one end and be closed in another end. A transverse hole is pierced in a radial direction from the vertical hole in the rod-like thread portion of the bolt. An annular groove is provided in an inner periphery of the valve stopper fitted around the rod-like thread portion of the bolt and is communicated with the transverse hole and a radial hole which is pierced in a radial direction from the annular groove in the valve stopper.

In another embodiment of the present invention, there is provided a hydraulic shock absorber wherein the needle protrudes so as to form a taper shape reducing its diameter gradually toward a leading end side on a center axis of the piston rod, enters the vertical hole of the through-hole as the piston rod goes into a far side of the oil chamber of the cylinder in the compression side stroke, and varies an opening degree of the through-hole based on a change of an area of an annular flow path which the leading end taper portion forms with respect to the vertical hole.

In another embodiment of the present invention, there is provided a hydraulic shock absorber comprising: a cylinder, a piston rod, a piston, and an oil reservoir chamber; the cylinder attached to one of a vehicle body side and an axle side. The piston rod is attached to the other of the vehicle body side and the axle side and is inserted into an oil chamber of the cylinder. The piston is provided in a leading end portion of the piston rod and which divides the oil chamber of the cylinder into a piston side oil chamber and a rod side oil chamber. The oil reservoir chamber compensates a volumetric capacity of the piston rod moves forward and backward to the oil chamber of the cylinder, the oil reservoir chamber is communicated with the oil chamber of the cylinder. A damping force generating device is provided between the piston side oil chamber and the rod side oil chamber of the cylinder. The damping force generating device is provided with a compression side flow path which circulates the oil in the piston side oil chamber of the cylinder from an outer flow path of the cylinder toward the rod side oil chamber in a compression side stroke. A compression side damping valve is provided in an upstream side of the compression side flow path. A compression side check valve is provided in a downstream side, and an intermediate portion between the compression side damping valve and the compression side check valve in the compression side flow path is communicated with the oil reservoir chamber. The damping force generating device is provided with an extension side flow path which circulates the oil in the rod side oil chamber of the cylinder from the outer flow path of the cylinder toward the piston side oil chamber in an extension side stroke. An extension side damping valve is provided in an upstream side of the extension side flow path. An extension side check valve is provided in a downstream side, and an intermediate portion between the extension side damping valve and the extension side check valve in the extension side flow path is communicated with the oil reservoir chamber. A side wall of the cylinder is provided with a through-hole which communicates the piston side oil chamber of the cylinder with the rod side oil chamber of the cylinder via the outer flow path of the cylinder, thereby enabling the through-hole to open and close by the piston according to a forward and backward position of the piston rod with respect to the oil chamber of the cylinder.

In another embodiment of the present invention, there is provided a hydraulic shock absorber wherein the through-hole provided in the side wall of the cylinder is provided at a plurality of positions which are along an axial direction of the cylinder.

In another embodiment of the present invention, there is provided a hydraulic shock absorber wherein the through-holes consist of six positions of the through-holes from the through-hole in a topmost portion which is not closed yet by the piston existing in an extending end in the axial direction of the cylinder to the through-hole in a bottommost portion which is closed by the piston existing in a compressing end.

In another embodiment of the present invention, there is provided a hydraulic shock absorber the cylinder consists of the outer tube and the inner tube, the cylinder is inserted and fitted into an inner portion of a damper tube so as to form a damper case, the damper case is a triple tube construction in which the damper tube, the outer tube and the inner tube of the cylinder are coaxially arranged, and an oil reservoir chamber is formed in an annular gap between the damper tube and the outer tube.

In accordance with the present embodiment, the following operations and effects can be achieved. In accordance with the present embodiment, the following operations and effects are achieved.

(a) In the hydraulic shock absorber, the damping force generating device is provided between the piston side oil chamber of the cylinder, and the rod side oil chamber. In the compression side stroke, the damping force generating device is provided with the compression side flow path which circulates the oil in the piston side oil chamber of the cylinder from the outer flow path of the cylinder toward the rod side oil chamber. The compression side damping valve is provided in the upstream side of the compression side flow path, and the compression side check valve is provided in the downstream side. The intermediate portion of the compression side damping valve and the compression side check valve in the compression side flow path is communicated with the oil reservoir chamber. In the extension side stroke, the damping force generating device is provided with the extension side flow path which circulates the oil in the rod side oil chamber of the cylinder from the outer flow path of the cylinder toward the piston side oil chamber. The extension side damping valve is provided in the upstream side of the extension side flow path, and the extension side check valve is provided in the downstream side, and the intermediate portion of the extension side damping valve and the extension side check valve in the extension side flow path is communicated with the oil reservoir chamber.

In the compression side stroke, the oil which is pressurized by a whole area of the piston of the piston rod, and whose pressure rises in the piston side oil chamber passes through the compression side damping valve in the upstream side of the compression side flow path of the damping force generating device so as to generate the compression side damping force. There is a flow of one oil in the oil flowing out of the compression side damping valve flows into the rod side oil chamber from the compression side check valve through the outer flow path of the cylinder. Further, a flow of the oil at the forward moving volumetric capacity of the piston rod, which corresponds to a flow of another oil in the oil flowing out of the compression side damping valve, flows into the oil reservoir chamber.

In the extension side stroke, the oil whose pressure is raised in the rod side oil chamber passes through the extension side damping valve in the upstream side of the extension side flow path of the damping force generating device from the outer flow path of the cylinder so as to generate the extension side damping force. The oil flowing out of the extension side damping valve flows into the piston side oil chamber through the extension side check valve after being mixed with the oil at the backward moving volumetric capacity of the piston rod which is replenished from the oil reservoir chamber.

Accordingly, if the piston rod moves forward to the far side of the oil chamber of the cylinder, and the needle provided in the piston rod is fitted to the through-hole of the damping force generating device, in the compression side stroke, the communication by the through-hole between the piston side oil chamber and the outer flow path, and the rod side oil chamber is shut off gradually. Therefore, the oil in the piston side oil chamber which is pressurized by the piston passes in large quantities through the compression side damping valve provided in the damping force generating device gradually, and generates a great damping force gradually. In other words, the damping force is changed according to the stroke of the compression side stroke, and the position dependency of the compression side damping force is indicated.

At this time, the damping force generated by the compression side damping valve provided in the damping force generating device according to the stroke of the compression side stroke is based on an amount of oil passing through the compression side damping valve. Further, the amount of oil passing through the compression side damping valve depends on a whole area of the piston which goes into the cylinder so as to pressurize the piston side oil chamber, and is extremely large. Accordingly, it is possible to increase the damping force generated by the compression side damping valve provided in the damping force generating device easily, and it is possible to obtain a great change of the damping force according to the stroke by the compression side damping valve.

(b) The damping force generating device is fixedly provided with the first and second base pistons around the bolt. In the first base piston there is provided with the compression side flow path which is opened and closed by the compression side damping valve and the extension side flow path which is opened and closed by the extension side check valve. In the second base piston, there is provided with the compression side flow path which is opened and closed by the compression side check valve and the extension side flow path which is opened and closed by the extension side damping valve. In the bolt, there is provided with the communication hole. Accordingly, it is possible to easily provide the communication hole from which the needle provided in the leading end portion of the piston rod comes in and out, and which communicates the piston side oil chamber of the cylinder with the oil reservoir chamber.

(c) In the hydraulic shock absorber, the damping force generating device is provided between the piston side oil chamber of the cylinder, and the rod side oil chamber. In the compression side stroke, the damping force generating device is provided with the compression side flow path which circulates the oil in the piston side oil chamber of the cylinder from the outer flow path of the cylinder toward the rod side oil chamber. The compression side damping valve is provided in the upstream side of the compression side flow path, and the compression side check valve is provided in the downstream side. The intermediate portion of the compression side damping valve and the compression side check valve in the compression side flow path is communicated with the oil reservoir chamber. In the extension side stroke, the damping force generating device is provided with the extension side flow path which circulates the oil in the rod side oil chamber of the cylinder from the outer flow path of the cylinder toward the piston side oil chamber. The extension side damping valve is provided in the upstream side of the extension side flow path, and the extension side check valve is provided in the downstream side. The intermediate portion of the extension side damping valve and the extension side check valve in the extension side flow path is communicated with the oil reservoir chamber.

In the compression side stroke, the oil which is pressurized by a whole area of the piston of the piston rod, and whose pressure rises in the piston side oil chamber passes through the compression side damping valve in the upstream side of the compression side flow path of the damping force generating device so as to generate the compression side damping force. A flow of one oil in the oil flowing out of the compression side damping valve flows into the rod side oil chamber from the compression side check valve through the outer flow path of the cylinder. Further, a flow of the oil at the forward moving volumetric capacity of the piston rod, which corresponds to a flow of another oil in the oil flowing out of the compression side damping valve, flows into the oil reservoir chamber.

In the extension side stroke, the oil whose pressure is raised in the rod side oil chamber passes through the extension side damping valve in the upstream side of the extension side flow path of the damping force generating device from the outer flow path of the cylinder so as to generate the extension side damping force. The oil flowing out of the extension side damping valve flows into the piston side oil chamber through the extension side check valve after mixed with the oil at the backward moving volumetric capacity of the piston rod which is replenished from the oil reservoir chamber.

As the piston rod moves forward to the far side of the oil chamber of the cylinder, and the piston provided in the piston rod passes through the through-hole which is provided in the side wall of the cylinder, in the compression side stroke, the communication by the through-hole between the piston side oil chamber and the outer flow path, and the rod side oil chamber is shut off. In accordance with this, the oil passing through the compression side damping valve of the damping force generating device grows to a great quantity due to the pressure application which the piston applies to the piston side oil chamber, and the compression side damping valve generates a great damping force.

On the other hand, in the extension side stroke, as the piston rod moves backward from the far side of the oil chamber of the cylinder, and the piston provided in the piston rod passes through the through-hole which is provided in the side wall of the cylinder, the piston side oil chamber and the outer flow path are communicated with the rod side oil chamber by the through-hole. In accordance with this, a part of the oil in the rod side oil chamber which is pressurized by the piston flows into the piston side oil chamber while passing through the through-hole without passing through the compression side damping valve of the damping force generating device from the outer flow path. An amount of the oil passing through the extension side damping valve of the damping force generating device is reduced, and the damping force generated by the extension side damping valve becomes small.

Accordingly, in any of the compression side stroke and the extension side stroke, the damping force is changed according to the strokes, and the position dependency of the damping force is indicated.

At this time, the damping forces generated by the compression side damping valve and the extension side damping valve of the damping force generating device according to the strokes of the compression side stroke and the extension side stroke are based on the amount of the oil passing through the compression side damping valve and the extension side damping valve. The amount of the oil passing through the compression side damping valve and the extension side damping valve depends on a total area of the piston which moves forward to and backward from the cylinder so as to pressurize the piston side oil chamber and the rod side oil chamber, and is relatively large. Accordingly, it is possible to easily increase the damping force generated by the compression side damping valve and the extension side damping valve provided in the damping force generating device, and it is possible to obtain a great change of the damping force according to the stroke by the compression side damping valve and the extension side damping valve.

(d) The through-holes provided in the side wall of the cylinder are provided at a plurality of positions which are along the axial direction of the cylinder.

Therefore, as the piston rod moves forward to the far side of the oil chamber of the cylinder, and the piston provided in the piston rod passes through each of the through-holes which are provided in the side wall of the cylinder, in the compression side stroke, the communication by the through-hole between the piston side oil chamber and the outer flow path, and the rod side oil chamber is shut off. As a result, the through-holes which directly communicate the piston side oil chamber with the outer flow path are reduced. In accordance with this, the amount of the oil flowing out to the outer flow path and the rod side oil chamber from the piston side oil chamber through the through-hole which is still communicated with the oil chamber is reduced gradually due to the pressure application which the piston applies to the piston side oil chamber. In other words, the oil passing through the compression side damping valve of the damping force generating device grows to a large quantity gradually, and the compression side damping valve generates a great damping force.

Further, in the extension side stroke, as the piston rod moves backward from the far side of the oil chamber of the cylinder, and the piston provided in the piston rod passes through each of the through-holes which are provided in the side wall of the cylinder, the piston side oil chamber and the outer flow path are communicated with the rod side oil chamber by the through-holes. As a result, the through-holes which directly communicate the piston side oil chamber with the outer flow path are increased. In accordance with this, a part of the oil in the rod side oil chamber which is pressurized by the piston flows into the piston side oil chamber from the outer flow path while passing through the through-holes without passing through the extension side damping valve of the damping force generating device. The amount of the oil passing through the extension side damping valve of the damping force generating device is reduced gradually, and the damping force generated by the extension side damping valve becomes small.

Therefore, in any of the compression side stroke and the extension side stroke, the damping force is smoothly changed gradually according to the strokes, and the position dependency of the damping force is indicated.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIGS. 4A and 4B are cross-sectional views showing a flow of an oil in the damping force generating device, wherein FIG. 4A shows a compression side stroke and FIG. 4B shows an extension side stroke;

FIGS. 5A to 5C show a second base piston (an extension side piston), wherein FIG. 5A is a plan view, FIG. 5B is a cross-sectional view and FIG. 5C is a bottom elevational view;

FIGS. 9A and 9B are cross-sectional views showing a flow of an oil in the damping force generating device, wherein FIG. 9A shows a compression side stroke and FIG. 9B shows an extension side stroke.

DESCRIPTION OF THE PREFERRED EMBODIMENTS

First Embodiment

FIGS. 1 to 5C

Figure 1:
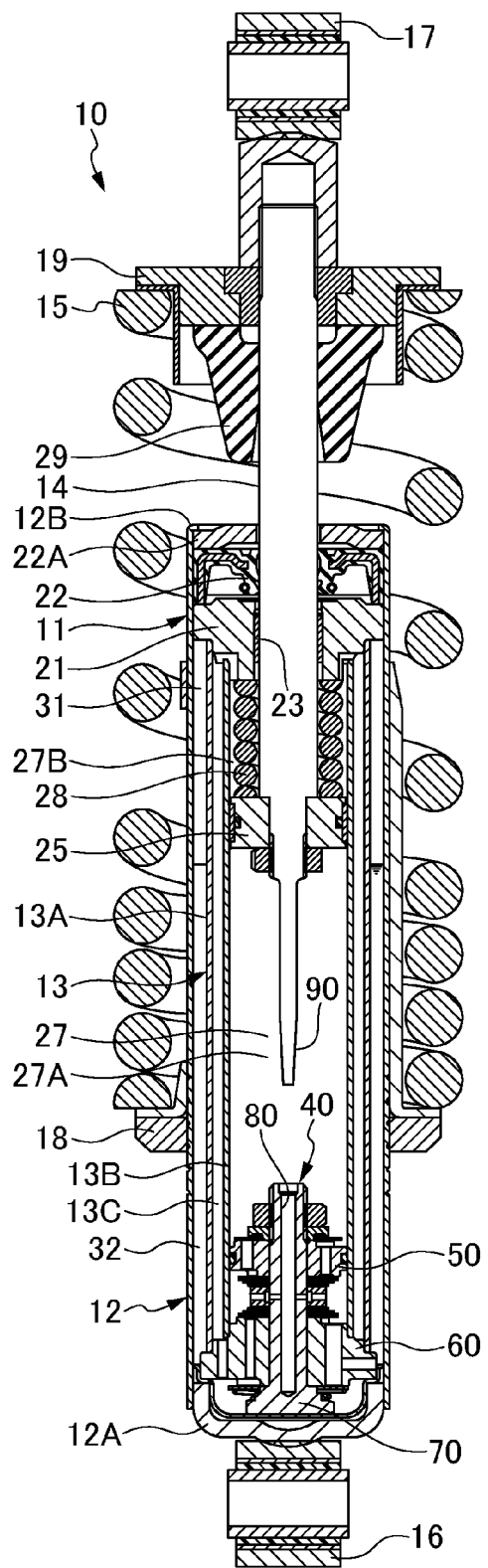
FIG. 1 is a general cross-sectional view showing a hydraulic shock absorber.
Figure 2:
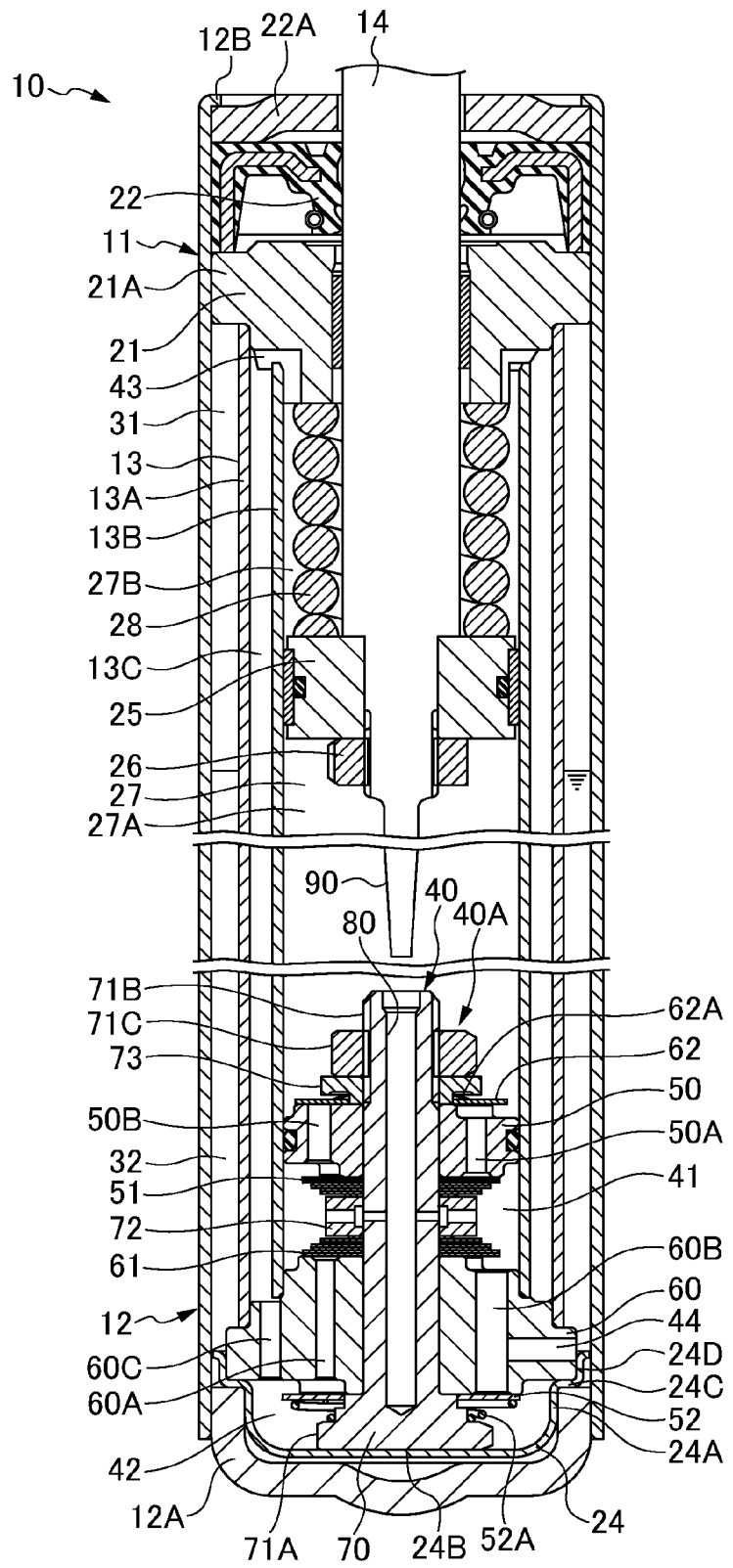
FIG. 2 is a cross-sectional view of a main part in FIG. 1.
Figure 3:
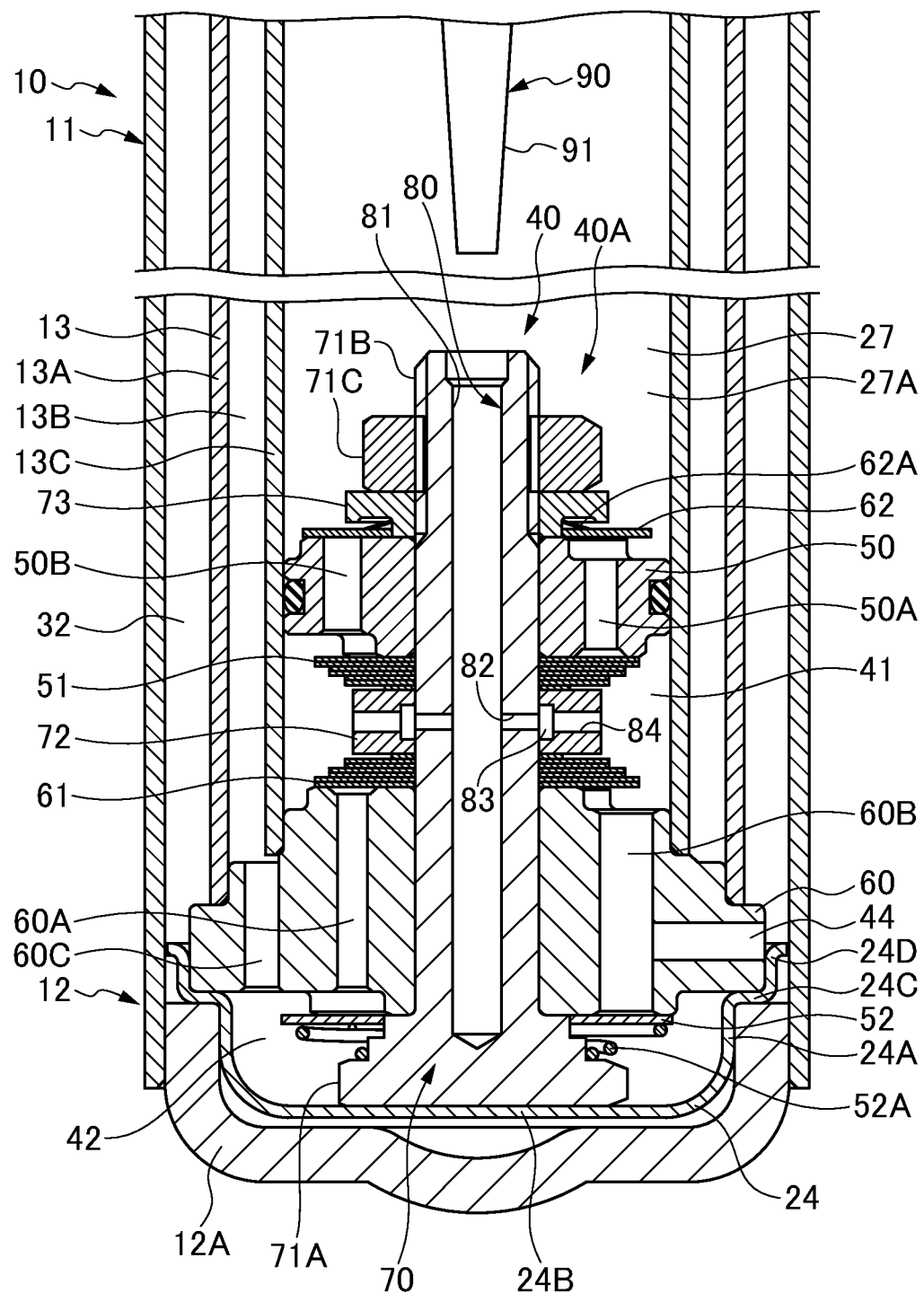
FIG. 3 is a cross-sectional view showing a damping force generating device.
Figure 6:
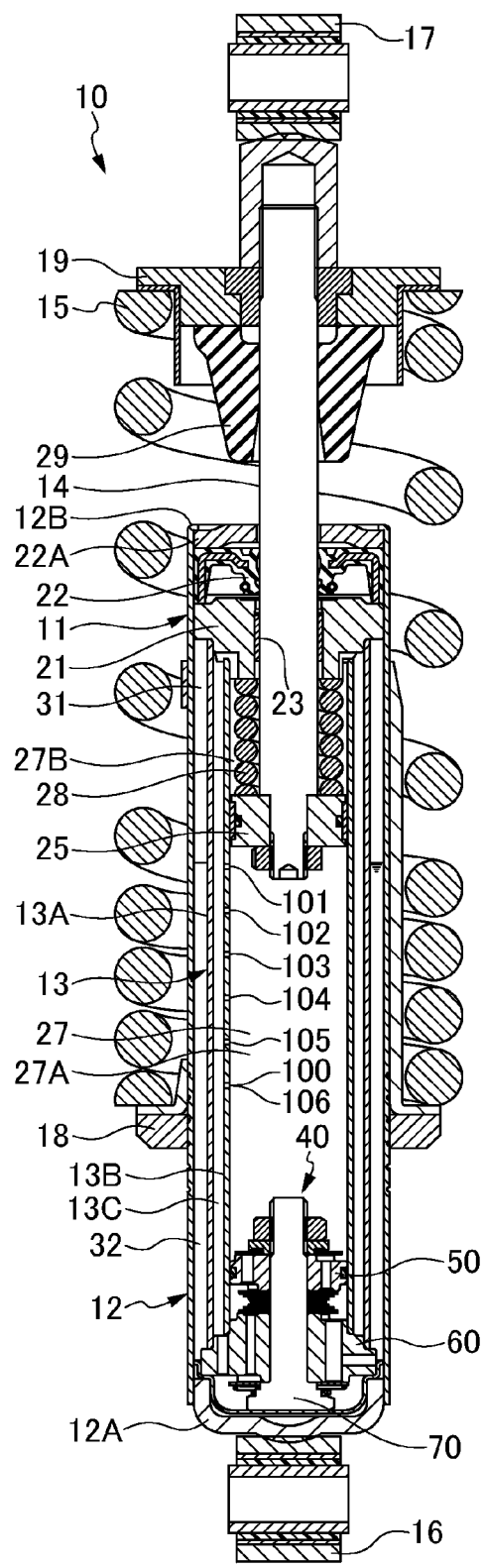
FIG. 6 is a general cross-sectional view showing a hydraulic shock absorber.
Figure 7:
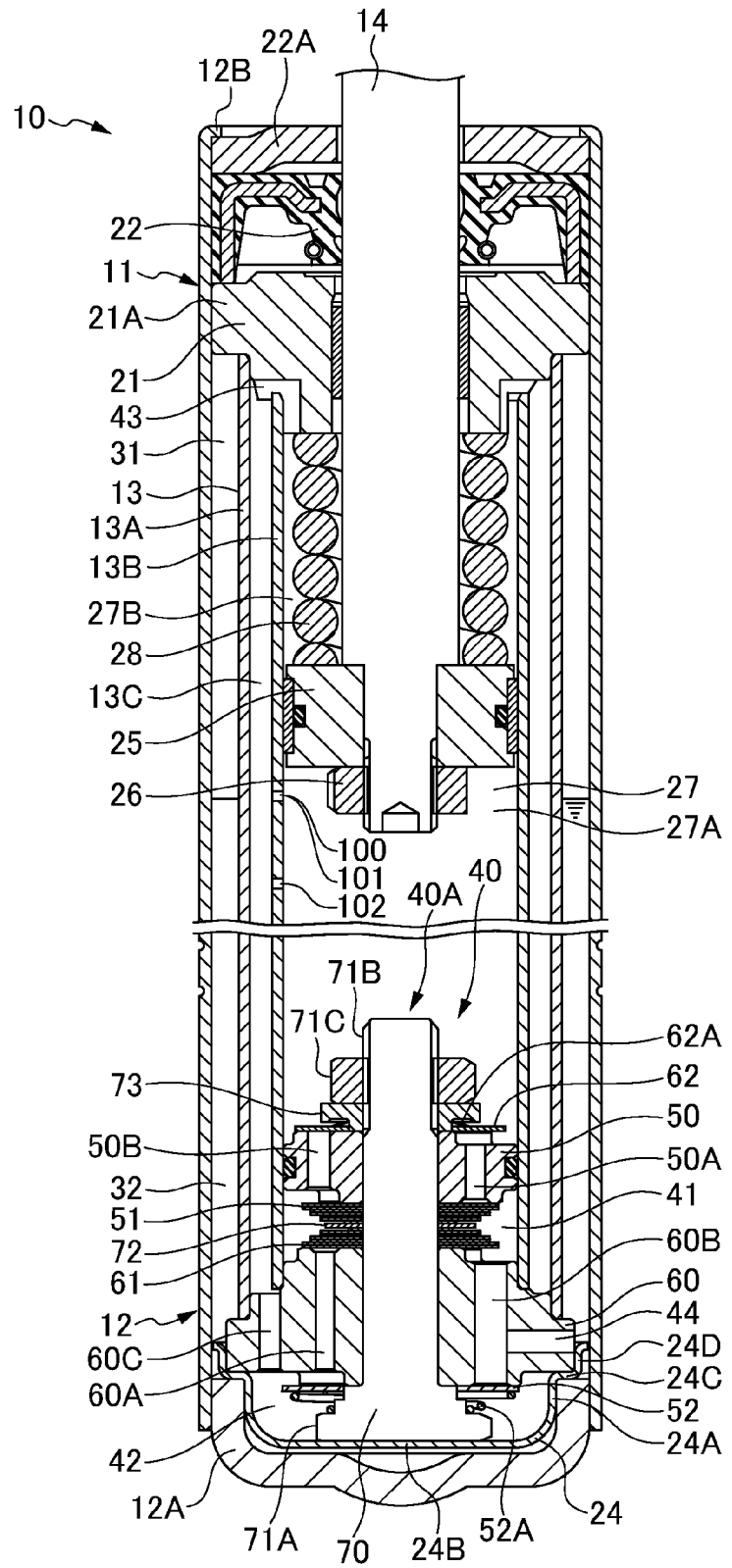
FIG. 7 is a cross-sectional view of a substantial part in FIG. 6.
Figure 8:
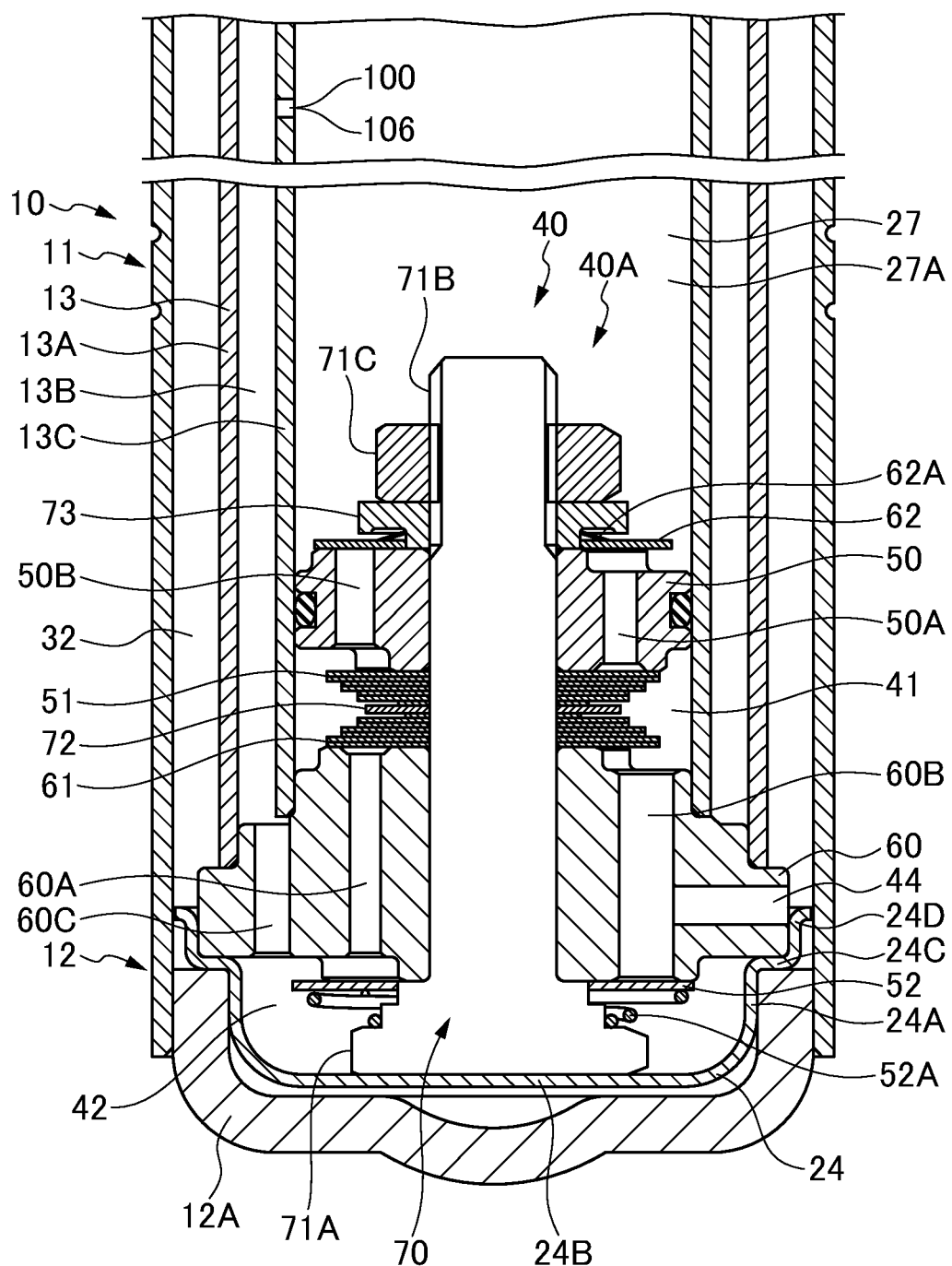
FIG. 8 is a cross-sectional view showing a damping force generating device.

A hydraulic shock absorber 10 is structured, as shown in FIGS. 1 to 3, such that a damper case 11 attached to an axle side has a damper tube 12, and a damper cylinder 13 is inserted and fitted into an inner portion of the damper tube 12. Further, the hydraulic shock absorber 10 is structured such that a piston rod 14 attached to a vehicle body side is slidably inserted into a center portion of the damper tube 12 of the damper case 11 and the cylinder 13, and a suspension spring 15 is interposed to an outer portion of the damper case 11 and the piston rod 14.

The damper case 11 is provided with an axle side attaching member 16 in a center portion of an outer face of a bottom cap 12A of the damper tube 12, and the piston rod 14 is provided with a vehicle body side attaching member 17. A spring receiver 18 is provided in an outer peripheral portion of the damper tube 12 in the damper case 11, and a spring receiver 19 is provided in an outer peripheral portion of the vehicle body side attaching member 17 in the piston rod 14. The suspension spring 15 is interposed between the spring receiver 18 and the spring receiver 19, and absorbs an impact force which a vehicle receives from a road surface by a spring force of the suspension spring 15.

The damper tube 12 of the damper case 11 is provided in its opening portion with a rod guide 21 through which the piston rod 14 passes. The rod guide 21 is structured such that a large outer diameter portion of a head portion 21A is inserted and attached into the damper tube 12 in a liquid tight manner, and the piston rod 14 is slidably inserted in a liquid tight manner into an inner diameter portion provided with an oil seal 22 and a bush 23.

The hydraulic shock absorber 10 is structured such that the damper case 11 inserts and fits the cylinder 13 into an inner portion of the damper tube 12. The cylinder 13 consists of an outer tube 13A and an inner tube 13B, and the damper case 11 is fixed in accordance with a welding or the like by fitting a lower end inner periphery of the damper tube 12 to an outer periphery of a cup-shaped bottom cap 12A.

An outer periphery of a body portion 24A of a cup-shaped bottom plate 24 made by pressing a steel plate is loose fitted to a cup inner periphery of the bottom cap 12A so as to be arranged to be centered (a bottom portion 24B of the bottom plate 24 interposes a fixed gap with respect to a cup bottom surface of the bottom cap 12A). A large outer diameter portion of an outer periphery of a second base piston 60 mentioned below is pressed into an inner periphery of a fitting tube portion 24D rising up from an outer periphery of a flange 24C of the bottom plate 24 mounted on a cup upper end surface of the bottom cap 12A so as to be arranged to be centered. A lower end surface of the second base piston 60 is mounted on an upper surface of the flange 24C of the bottom plate 24. Further, each of lower end inner peripheries of the outer tube 13A and the inner tube 13B of the cylinder 13 is fixed to each of a middle outer diameter portion and a small outer diameter portion of an outer periphery of the second base piston 60 by a pressure insertion or the like.

On the other hand, each of upper end inner peripheries of the outer tube 13A and the inner tube 13B of the cylinder 13 is fixed to each of a middle outer diameter portion and a small outer diameter portion which are provided below the head portion 21A of the rod guide 21 by a pressure insertion or the like. Further, the head portion 21A of the rod guide 21 is inserted and attached into the damper tube 12, the damper tube 12 protrudes upward from an oil seal 22 on the head portion 21A and a washer 22A which is provided on an upper face of the oil seal 22, and sets a protruding end to a caulking portion 12B. The damper tube 12 is structured such that the outer tube 13A and the inner tube 13B of the cylinder 13 are fixed by being pinched in an axial direction between the bottom cap 12A and the caulking portion 12B via the rod guide 21, the oil seal 22, the washer 22A, the bottom plate 24 and the second base piston 60.

The hydraulic shock absorber 10 is structured in accordance with the above, such that a whole of the damper case 11 is formed as a triple tube in which the damper tube 12, the outer tube 13A and the inner tube 13B of the cylinder 13 are coaxially arranged. Further, an oil chamber 27 consisting of a piston side oil chamber 27A and a rod side oil chamber 27B is formed in an inner portion of the inner tube 13B. An outer flow path 13C communicating the piston side oil chamber 27A and the rod side oil chamber 27B is formed by an annular gap between the outer tube 13A and the inner tube 13B, and an annular gap between the damper tube 12 and the outer tube 13A is set to an air chamber 31 and an oil reservoir chamber 32.

In other words, the hydraulic shock absorber 10 is structured such that when the piston rod 14 is inserted into a center portion of the damper tube 12 of the damper case 11 and the cylinder 13, the piston 25 inserted and attached into a leading end portion of the piston rod 14 is fixed by a nut 26, and the oil chamber 27 of the cylinder 13 is divided into the piston side oil chamber 27A and the rod side oil chamber 27B, by the piston 25 which is slidably inserted into an inner periphery of the inner tube 13B. Reference numeral 28 denotes a rebound spring, and reference numeral 29 denotes a bump rubber.

Further, the hydraulic shock absorber 10 is provided with an air chamber 31 and an oil reservoir chamber 32 respectively in upper and lower sides of an annular gap of the damper tube 12 and the outer tube 13A, is provided with the oil reservoir chamber 32 in such a manner as to communicate with the oil chamber 27 of the cylinder 13, and compensates a volumetric capacity (including a volumetric capacity of a temperature expansion of the oil) of the piston rod 14 which moves forward and backward to the oil chamber 27 of the cylinder 13 by the oil reservoir chamber 32.

The hydraulic shock absorber 10 is provided with a damping force generating device 40 between the piston side oil chamber 27A and the rod side oil chamber 27B of the cylinder 13.

The damping force generating device 40 has first and second base pistons 50 and 60 which are fixed to two positions along the axial direction of the cylinder 13 and are arranged in parallel.

The damping force generating device 40 is inserted and attached into each of the lower end inner peripheries of the outer tube 13A and the inner tube 13B of the cylinder 13 so as to be embedded, such that a valve unit 40A in which the first and second base pistons 50 and 60 are fixedly provided around a bolt 70.

The valve unit 40A of the damping force generating device 40 has a compression side check valve 52 (a valve spring 52A), a second base piston 60, an extension side damping valve 61, a valve stopper 72, a compression side damping valve 51, the first base piston 50, an extension side check valve 62, and a valve stopper 73, which are loaded in a skewered manner to an outer periphery of a rod-like thread portion 71B in that order from a side of the head portion 71A of the bolt 70. This is immobilized by a nut 71C which is threadably attached to the rod-like thread portion 71B.

The valve unit 40A of the damping force generating device 40 is structured such that a large outer diameter portion in an outer periphery of the second base piston 60 is assembled as mentioned above with respect to the flange 24C and the fitting tube portion 24D of the bottom plate 24 which is loose fitted to the bottom cap 12A. Each of the lower end inner peripheries of the outer tube 13A and the inner tube 13B of the cylinder 13 is assembled as mentioned above in each of the middle outer diameter portion and the small outer diameter portion of the outer periphery of the second base piston 60. The first base piston 50 is inserted and attached in a liquid tight manner into an inner periphery of the inner tube 13B of the cylinder 13 via an O-ring which is provided in an outer periphery. Accordingly, the second base piston 60 of the valve unit 40A is immobilized to the bottom portion in one end side of the cylinder 13, and the first base piston 50 of the valve unit 40A is immobilized to the inner periphery of the cylinder 13.

The damping force generating device 40 is structured such that an annular space which is sandwiched between the first base piston 50 and the second base piston 60 in the inner portion of the inner tube 13B is set to an extension and compression common flow path 41. An upper space of the first base piston 50 in the inner portion of the inner tube 13B is set to a piston side oil chamber 27A. A lower space of the second base piston 60 in the inner portion of the inner tube 13B is set to an extension and compression common flow path 42 which is communicated with the rod side oil chamber 27B via a hole-like flow path 60C pierced in the second base piston 60, and an outer flow path 13C between the outer tube 13A and the inner tube 13B of the cylinder 13. An extension and compression common flow path 43 which communicates the rod side oil chamber 27B with the outer flow path 13C is formed in a notched manner in an upper end side of the inner tube 13B, that is, a small outer diameter portion of the rod guide 21 in the present embodiment.

The damping force generating device 40 is provided with a compression side flow path 50A which is opened and closed by the compression side damping valve 51, and an extension side flow path 50B which is opened and closed by the extension side check valve 62, in the first base piston 50, and is provided with a compression side flow path 60B which is opened and closed by the compression side check valve 52, and an extension side flow path 60A which is opened and closed by the extension side damping valve 61, in the second base piston 60. The damping force generating device 40 communicates the piston side oil chamber 27A and the rod side oil chamber 27B of the cylinder 13, via the extension and compression common flow paths 41, 42 and 43, the compression side flow path 50A and the extension side flow path 50B which are provided in the first base piston 50, the compression side flow path 60B, the extension side flow path 60A and the hole-like flow path 60C which are provided in the second base piston 60, and the outer flow path 13C which is provided in the annular gap between the outer tube 13A and the inner tube 13B of the cylinder 13. The piston 25 is not provided with a flow path which communicates the piston side oil chamber 27A and the rod side oil chamber 27B.

The damping force generating device 40 is provided with a communication passage 44 in the second base piston 60. The communication passage 44 communicates an intermediate portion (a portion communicating with the extension and compression common flow path 41) of the compression side damping valve 51 and the compression side check valve 52 which are provided in the compression side flow paths 50A and 60B of the first base piston 50 and the second base piston

60, with the oil reservoir chamber 32. The communication passage 44 communicates an intermediate portion (a portion communicating with the extension and compression common flow path 41) of the extension side damping valve 61 and the extension side check valve 62 which are provided in the extension side flow paths 50B and 60A of the first base piston 50 and the second base piston 60, with the oil reservoir chamber 32. The second base piston 60 makes a part of an outer periphery of a large outer diameter portion which is pressed into the fitting tube portion 24D of the bottom plate 24 face the oil reservoir chamber 32, when it is assembled in the damper tube 12 of the damper case 11 and the cylinder 13 as mentioned above. Further, the second base piston 60 is pierced with a transverse hole which runs up to the intermediate portion of the compression side flow path 60B from a part of the outer periphery mentioned above of the large outer diameter portion toward a radial direction, as shown in FIGS. 5A to 5C, and set the transverse hole to the communication passage 44.

Accordingly, the damping force generating device 40 of the hydraulic shock absorber 10 is structured to use the compression side flow path (the extension and compression common flow paths 41, 42 and 43, the compression side flow paths 50A and 60B, and the hole-like flow path 60C) which circulates the oil in the piston side oil chamber 27A of the cylinder 13 from the outer flow path 13C of the cylinder 13 toward the rod side oil chamber 27B in the compression side stroke. It is provided with the compression side damping valve 51 in an upstream side of the compression side flow path (the extension and compression common flow paths 41, 42 and 43 the compression side flow paths 50A and 60B, and the hole-like flow path 60C). It is provided with the compression side check valve 52 in a downstream side, and communicates the intermediate portion of the compression side damping valve 51 and the compression side check valve 52 in the compression side flow path (the extension and compression common flow paths 41, 42 and 43, the compression side flow paths 50A and 60B, and the hole-like flow path 60C) with the oil reservoir chamber 32 via the communication passage 44.

Further, it is structured such as to use the extension side flow path (the extension and compression common flow paths 41, 42 and 43, the extension side flow paths 50B and 60A, and the hole-like flow path 60C) which circulates the oil in the rod side oil chamber 27B of the cylinder 13 from the outer flow path 13C of the cylinder 13 toward the piston side oil chamber 27A in the extension side stroke. It is provided with the expansion side damping valve 61 in an upstream side of the extension side flow path (the extension and compression common flow paths 41, 42 and 43, the extension side flow paths 50B and 60A, and the hole-like flow path 60C). It is provided with the extension side check valve 62 in a downstream side, and communicates the intermediate portion of the extension side damping valve 61 and the extension side check valve 62 in the extension side flow path (the extension and compression common flow paths 41, 42 and 43, the extension side flow paths 50B and 60A, and the hole-like flow path 60C) with the oil reservoir chamber 32 via the communication passage 44.

Accordingly, in the hydraulic shock absorber 10, the following structure is provided, for applying a position dependency to the damping force generated by the compression side damping valve 51 of the damping force generating device 40, increasing the damping force generated by the compression side damping valve 51 easily, and increasing a change (a position dependency) according to a stroke of the damping force.

In other words, the damping force generating device 40 of the hydraulic shock absorber 10 is provided with a through-hole 80 (which consists of a vertical hole 81 and a transverse hole 82 which are provided in the bolt 70, and an annular groove 83 and a radial hole 84 which are provided in the valve stopper 72, as mentioned below). This communicates the piston side oil chamber 27A of the cylinder 13 with the rod side oil chamber 27B via the outer flow path 13C. Further, a leading end portion of the piston rod 14 is provided with a needle 90 which can come in and out of the through-hole 80 (the vertical hole 81) of the damping force generating device 40. An opening degree of the through-hole 80 (the vertical hole 81) can be varied by the needle 90 according to a forward and backward moving position of the piston rod 14 with respect to the oil chamber 27 of the cylinder 13.

In the present embodiment, the through-hole 80 is provided in the bolt 70 which constitutes the valve unit 40A of the damping force generating device 40, and consists of the vertical hole 81 and the transverse hole 82, the annular groove 83, and the radial hole 84. The vertical hole 81 is pierced from an opposite side to a head portion 71A on a center axis of a rod-like thread portion 71B of the bolt 70 and is formed so as to be open in one end and be closed in another end. The transverse hole 82 is pieced in a radial direction from the vertical hole 81 in the rod-like thread portion 71B of the bolt 70. The annular groove 83 is provided in an inner periphery of the valve stopper 72 fitted around the rod-like thread portion 71B of the bolt 70, and is communicated with the transverse hole 82. The radial hole 84 is pieced in a radial direction from the annular groove 83 in the valve stopper 72. The oil in the piston side oil chamber 27A of the cylinder 13 passes through the extension and compression common flow path 41 and the compression side flow path 60B of the second base piston 60 from the through-hole 80 mentioned above, runs up to the extension and compression common flow path 42 while opening the compression side check valve 52, further runs up to the outer flow path 13C via the extension side flow path 60A of the second base piston 60, and communicates with the rod side oil chamber 27B from the extension and compression common flow path 43.

The needle 90 protrudes in such a manner as to form a taper shape which is reduced in diameter gradually on the center axis of the piston rod 14 toward its leading end side. It enters the vertical hole 81 of the through-hole 80 as the piston rod 14 moves forward to a far side of the oil chamber 27 of the cylinder 13 in the compression side stroke, and can vary the opening degree of the through-hole 80 in accordance with a change of an area of the annular flow path which a leading end taper portion 91 forms with respect to the vertical hole 81.

Accordingly, the hydraulic shock absorber 10 carries out a damping action as mentioned below.

(Compression Side Stroke) (Flow of Solid Arrow in FIG. 4A)

If the pressure of the oil in the piston side oil chamber 27A rises, a part of the oil in the piston side oil chamber 27A flows out to the extension and compression common flow path 41 through the bolt 70 of the damping force generating device 40, and the through-hole 80 which is provided in the valve stopper 72. The other part of the oil in the piston side oil chamber 27A flows out to the extension and compression common flow path 41 after pushing open the compression side damping valve 51 of the compression side flow path 50A of the first base piston 50 of the damping force generating device 40 so as to generate the compression side damping force. The oil flowing out to the extension and compression common flow path 41 as mentioned above is separated into two parts in the compression side flow path 60B of the second base piston 60. One oil flows out to the rod side oil chamber 27B from the compression side check valve 52 of the compression side flow path 60B of the second base piston 60 through the extension and compression common flow path 42, the hole-like flow path 60C of the second base piston 60, the outer flow path 13C of the cylinder 13, and the extension and compression common flow path 43. Another oil is discharged to the oil reservoir chamber 32 from the communication passage 44 of the second base piston 60. Another oil discharged to the oil reservoir chamber 32 compensates for the oil at the forward moving volumetric capacity of the piston rod 14.

As the piston rod 14 moves forward to the far side of the oil chamber 27 of the cylinder 13, and the needle 90 provided in the piston rod 14 enters the through-hole 80 of the damping force generating device 40 so as to narrow the opening degree of the through-hole 80 gradually. In this compression side stroke, the communication by the through-hole 80 between the piston side oil chamber 27A and the outer flow path 13C, and the rod side oil chamber 27B is shut off gradually. Accordingly, the oil in the piston side oil chamber 27A which is pressurized by the piston 25 passes in large quantities through the compression side damping valve 51 which is provided in the damping force generating device 40 gradually, thereby generating a great damping force gradually. In other words, the damping force is changed according to the stroke of the compression side stroke, thereby indicating a position dependency of the compression side damping force. The position dependency is set by selecting a shape of a leading end taper portion 91 of the needle 90.

(Extension Side Stroke) (Flow of Solid Arrow in FIG. 4B)

The pressure of the oil in the rod side oil chamber 27B rises, the oil flows into the hole-like flow path 60C of the second base piston 60 of the damping force generating device 40, and the extension and compression common flow path 42 through the extension and compression common flow path 43 and the outer flow path 13C of the cylinder 13, and pushes open the extension side damping valve 61 of the extension side flow path 60A of the second base piston 60 so as to generate the extension side damping force. The oil flowing out to the extension and compression common flow path 41 from the extension side damping valve 61 flows out to the piston side oil chamber 27A through the extension side check valve 62 of the extension side flow path 50B of the first base piston 50 after being mixed with the oil which is replenished from the oil reservoir chamber 32 via the communication passage 44 of the second base piston 60 and the compression side flow path 60B. The oil replenished from the oil reservoir chamber 32 compensates for the oil at the backward moving volumetric capacity of the piston rod 14.

Therefore, in accordance with the present embodiment, the following operations and effects are achieved.

(a) In the hydraulic shock absorber 10, the damping force generating device 40 is provided between the piston side oil chamber 27A of the cylinder 13, and the rod side oil chamber 27B. In the compression side stroke the damping force generating device 40 is provided with the compression side flow path (the extension and compression common flow paths 41, 42 and 43, the compression side flow paths 50A and 60B and the hole-like flow path 60C) which circulates the oil in the piston side oil chamber 27A of the cylinder 13 from the outer flow path 13C of the cylinder 13 toward the rod side oil chamber 27B. The compression side damping valve 51 is provided in the upstream side of the compression side flow path (the extension and compression common flow paths 41, 42 and 43, the compression side flow paths 50A and 60B, and the hole-like flow path 60C). The compression side check valve 52 is provided in the downstream side. The intermediate portion of the compression side damping valve 51 and the compression side check valve 52 in the compression side flow path (the extension and compression common flow paths 41, 42 and 43, the compression side flow paths 50A and 60B, and the hole-like flow path 60C) is communicated with the oil reservoir chamber 32. In the extension side stroke, the damping force generating device 40 is provided with the extension side flow path (the extension and compression common flow paths 41, 42 and 43, the extension side flow paths 50B and 60A and the hole-like flow path 60C) which circulates the oil in the rod side oil chamber 27B of the cylinder 13 from the outer flow path 13C of the cylinder 13 toward the piston side oil chamber 27A. The extension side damping valve 61 is provided in the upstream side of the extension side flow path (the extension and compression common flow paths 41, 42 and 43, the extension side flow paths 50B and 60A, and the hole-like flow path 60C). The extension side check valve 62 is provided in the downstream side. The intermediate portion of the extension side damping valve 61 and the extension side check valve 62 in the extension side flow path (the extension and compression common flow paths 41, 42 and 43, the extension side flow paths 50B and 60A, and the hole-like flow path 60C) is communicated with the oil reservoir chamber 32.

In the compression side stroke, the oil which is pressurized by a whole area of the piston 25 of the piston rod 14, and whose pressure rises in the piston side oil chamber 27A passes through the compression side damping valve 51 in the upstream side of the compression side flow path (the extension and compression common flow paths 41, 42 and 43, the compression side flow paths 50A and 60B and the hole-like flow path 60C) of the damping force generating device 40 so as to generate the compression side damping force. There is a flow of one oil in the oil flowing out of the compression side damping valve 51 flows into the rod side oil chamber 27B from the compression side check valve 52 through the outer flow path 13C of the cylinder 13. Further, a flow of the oil at the forward moving volumetric capacity of the piston rod 14, which corresponds to a flow of another oil in the oil flowing out of the compression side damping valve 51, flows into the oil reservoir chamber 32. At this time, the pressure of the rod side oil chamber 27B approximately depends only on the pressure of the air chamber 31 (since a flow path resistance from the compression side check valve 52 in the downstream side of the compression side damping valve 51 to the outer flow path 13C of the cylinder 13 is small), and does not fluctuate due to setting of the flow path resistance of the compression side damping valve 51. Accordingly, it is possible to avoid an interruption of the damping force at a time of being inverted to the extension side.

In the extension side stroke, the oil whose pressure is raised in the rod side oil chamber 27B passes through the extension side damping valve 61 in the upstream side of the extension side flow path (the extension and compression common flow paths 41, 42 and 43, the extension side flow paths 50B and 60A and the hole-like flow path 60C) of the damping force generating device 40 from the outer flow path 13C of the cylinder 13 so as to generate the extension side damping force. The oil flowing out of the extension side damping valve 61 flows into the piston side oil chamber 27A through the extension side check valve 62 after being mixed with the oil at the backward moving volumetric capacity of the piston rod 14 which is replenished from the oil reservoir chamber 32.

In this case, in the compression side stroke, it is possible to raise the pressure of the rod side oil chamber 27B to a positive pressure so as to improve a damping response at a time of being inverted to the extension side, by setting the pressure of the air chamber 31 pressurizing the oil reservoir chamber 32 to a high pressure.

Accordingly, if the piston rod 14 moves forward to the far side of the oil chamber 27 of the cylinder 13, and the needle 90 provided in the piston rod 14 is fitted to the through-hole 80 of the damping force generating device 40, in the compression side stroke, the communication by the through-hole 80 between the piston side oil chamber 27A and the outer flow path 13C, and the rod side oil chamber 27B is shut off gradually. Therefore, the oil in the piston side oil chamber 27A which is pressurized by the piston 25 passes in large quantities through the compression side damping valve 51 provided in the damping force generating device 40 gradually, and generates a great damping force gradually. In other words, the damping force is changed according to the stroke of the compression side stroke, and the position dependency of the compression side damping force is indicated.

At this time, the damping force generated by the compression side damping valve 51 provided in the damping force generating device 40 according to the stroke of the compression side stroke is based on an amount of oil passing through the compression side damping valve 51. Further, the amount of oil passing through the compression side damping valve 51 depends on a whole area of the piston 25 which goes into the cylinder 13 so as to pressurize the piston side oil chamber 27A, and is relatively large. Accordingly, it is possible to increase the damping force generated by the compression side damping valve 51 provided in the damping force generating device 40 easily, and it is possible to obtain a great change of the damping force according to the stroke by the compression side damping valve 51.

(b) The damping force generating device 40 is fixedly provided with the first and second base pistons 50 and 60 around the bolt 70. It is provided in the first base piston 50 with the compression side flow path 50A which is opened and closed by the compression side damping valve 51, and the extension side flow path 50B which is opened and closed by the extension side check valve 62. It is provided in the second base piston 60 with the compression side flow path 60B which is opened and closed by the compression side check valve 52, and the extension side flow path 60A which is opened and closed by the extension side damping valve 61, and is provided in the bolt 70 with the communication hole 80. Accordingly, it is possible to easily provide the communication hole 80 which the needle 90 provided in the leading end portion of the piston rod 14 comes in and out, and which communicates the piston side oil chamber 27A of the cylinder 13 with the oil reservoir chamber 32.

In this case, in the hydraulic shock absorber 10 in accordance with the present embodiment, the following operations and effects can be achieved.

(c) The second base piston 60 is provided with the communication passage 44 which communicates the intermediate portion of the compression side damping valve 51 and the compression side check valve 52 which are respectively provided in the compression side flow paths 50A and 60B of the first and second base pistons 50 and 60 with the oil reservoir chamber 32, and communicates the intermediate portion of the extension side damping valve 61 and the extension check valve 62 which are respectively provided in the extension side flow paths 50B and 60A of the first and second base pistons 50 and 60 with the oil reservoir chamber 32. Accordingly, the flow path of the oil in the item (a) mentioned above which flows out to the oil reservoir chamber 32 from the piston side oil chamber 27A through the damping force generating device 40 in the compression side stroke, and the flow path of the oil in the item (a) mentioned above which flows out to the piston side oil chamber 27A from the oil reservoir chamber 32 through the damping force generating device 40 in the extension side stroke, are formed by the communication path 44 which is provided in the second base piston 60. Since the communication path 44 is a flow path such as a simple transverse hole, it can easily secure the flow path area of the oil chamber 27 of the cylinder 13 to the oil reservoir chamber 32, and can smoothly apply the pressure in the air chamber 31 to the rod side oil chamber 27B. It is possible to further securely avoid the interruption of the damping force at a time of being inverted to the extension side. Further, the communication path 44 can set its flow path length short and set its flow path resistance small, and can improve freedom of setting. Further, the communication passage 44 can be formed only by processing a hole in the second base piston 60, and it is possible to reduce a cost without increasing the number of the parts.

(d) In the hydraulic shock absorber 10, the outer flow path 13C communicating the piston side oil chamber 27A and the rod side oil chamber 27B is provided around the oil chamber 27 of the cylinder 13 in the damper case 11, and the oil reservoir chamber 32 is provided around the oil chamber 27 of the cylinder 13 and the outer flow path 13C in the damper case 11. Accordingly, the oil chamber 27 is provided in the center portion of the cylinder 13 in the damper case 11, the outer flow path 13C is provided in the outer side of the oil chamber 27, and the oil reservoir chamber 32 is provided in the further outer side of the outer flow path 13C. In accordance with this, in the hydraulic shock absorber 10, the oil chamber 27 of the cylinder 13, the outer flow path 13C and the oil reservoir chamber 32 can be provided together in the inner portion of the damper case 11 having a short whole length, without making the damper case 11 long and large, and it is possible to improve a freedom of layout in a vehicle to which this is mounted.

(e) The damper case 11 inserts and fits the cylinder 13 into the inner portion of the damper tube 12, the cylinder 13 consists of the outer tube 13A and the inner tube 13B. The oil chamber 27 is formed in the inner portion of the inner tube 13B, the outer flow path 13C is formed between the outer tube 13A and the inner tube 13B, and the oil reservoir chamber 32 is formed between the damper tube 12 and the outer tube 13A. By a triple pipe structure consisting of the damper tube 12 and the outer tube 13A and the inner tube 13B of the cylinder 13, it is possible to achieve the item (c) mentioned above compactly.

(f) The first and second base pistons 50 and 60 are fixedly provided around the bolt 70, and the second base piston 60 is immobilized to the bottom portion in one end side of the cylinder 13. Accordingly, the first and second base pistons 50 and 60 can be assembled easily at two positions which are along the axial direction of the cylinder 13.

In this case, the damping force generating device 40 may be accessorily provided with a compression side damping force generating means in the compression side check valve 52 which is provided in the downstream side of the compression side flow path (the extension and compression common flow paths 41, 42 and 43, the compression side flow paths 50A and 60B and the hole-like flow path 60C). The compression side damping force generating means can be constructed by setting the compression side check valve 52 to a laminated disc valve and/or setting the compression side flow path 60B provided with the compression side check valve 52 to a throttle flow path.

In accordance with this, in the compression side stroke, the flow of the one oil in the oil flowing out of the compression side damping valve 51 in the upstream side flows into the rod side oil chamber 27B from the compression side check valve 52 through the outer flow path 13C of the cylinder 13. However, the compression side check valve 52 achieves a compression side damping force generating function as well as a check function. The compression side check valve 52 generates a damping force ΔF which depends on a piston speed, and a pressure Pr of the rod side oil chamber 27B comes to a value obtained by subtracting ΔF from a pressure Pa of the air chamber 31 pressurizing the oil reservoir chamber 32, in other words, a value which is controlled while depending on the piston speed.

The fact that the pressure Pr of the rod side oil chamber 27B is controlled while depending on the piston speed in the compression side stroke means that a rising characteristic of the damping force at a time of being inverted to the extension side can be controlled while depending on the piston speed. When the piston speed is high, ΔF becomes larger due to the throttle of the compression side check valve 52, and Pr becomes smaller. Accordingly, a rising edge of the damping force at a time of being inverted to the extension side becomes slow so as to improve a riding quality. When the piston speed is low, ΔF caused by the throttle of the compression side check valve 52 becomes smaller, and Pr becomes larger. Accordingly, a rising edge of the damping force at a time of being inverted to the extension side becomes sharp so as to suppress a wobbling feeling of the vehicle body and improve a traveling stability.

At this time, a total amount of the compression side damping force comes to a summation of the damping force of the compression side damping valve 51 and the damping force of the compression side check valve 52. However, the damping force of the compression side damping valve 51 is made larger in a normal setting. The total amount of the compression side damping force approximately depends on the damping force of the compression side damping valve 51.

Further, the damping force generating device 40 may be accessorily provided with an extension side damping force generating means in the extension side check valve 62 which is provided in the downstream side of the extension side flow path (the extension and compression common flow paths 41, 42 and 43, the extension side flow paths 50B and 60A and the hole-like flow path 60C). The extension side damping force generating means can be constructed by setting the extension side check valve 62 to a laminated disc valve and/or setting the extension side flow path 50B provided with the extension side check valve 62 to a throttle flow path.

In accordance with this, in the extension side stroke, the flow of the one oil in the oil flowing out of the extension side damping valve 61 in the upstream side flows into the piston side oil chamber 27A from the extension side check valve 62 through the outer flow path 13C of the cylinder 13. However, the extension side check valve 62 achieves an extension side damping force generating function as well as a check function. The extension side check valve 62 generates a damping force ΔF which depends on the piston speed, and a pressure Pp of the piston side oil chamber 27A comes to a value obtained by subtracting ΔF from the pressure Pa of the air chamber 31 pressurizing the oil reservoir chamber 32, in other words, a value which is controlled while depending on the piston speed.

The fact that the pressure Pp of the piston side oil chamber 27A is controlled while depending on the piston speed in the extension side stroke means that a rising characteristic of the damping force at a time of being inverted to the compression side can be controlled while depending on the piston speed. When the piston speed is high, ΔF becomes larger due to the throttle of the extension side check valve 62, and Pp becomes smaller. Accordingly, a rising edge of the damping force at a time of being inverted to the compression side becomes slow so as to improve a riding quality. When the piston speed is low, ΔF caused by the throttle of the extension side check valve 62 becomes smaller, and Pp becomes larger. Accordingly, a rising edge of the damping force at a time of being inverted to the compression side becomes sharp so as to suppress a wobbling feeling of the vehicle body and improve traveling stability.

At this time, a total amount of the extension side damping force comes to a summation of the damping force of the extension side damping valve 61 and the damping force of the extension side check valve 62. However, the damping force of the extension side damping valve 61 is made larger in a normal setting. The total amount of the extension side damping force approximately depends on the damping force of the extension side damping valve 61.

Second Embodiment

FIGS. 6 to 9B

In a hydraulic shock absorber 10 in accordance with a second embodiment, the following structure is provided for applying a position dependency to the damping force generated by the compression side damping valve 51 and the extension side damping valve 61 of the damping force generating device 40, easily increasing the damping force generated by the compression side damping valve 51 and the extension side damping valve 61, and increasing the change (the position dependency) according to the strokes of the damping forces.

In other words, the damping force generating device 40 of the hydraulic shock absorber 10 is provided in a side wall of the inner tube 13B of the cylinder 13 with a through-hole 100 which communicates the piston side oil chamber 27A of the cylinder 13 with the rod side oil chamber 27B via the outer flow path 13C. Further, the through-hole 100 can be opened and closed by the outer peripheral portion of the piston 25 according to the forward and backward moving position of the piston rod 14 with respect to the oil chamber 27 of the cylinder 13.

In the present embodiment, the through-hole 100 provided in the side wall of the inner tube 13B of the cylinder 13 is provided at a plurality of positions along the axial direction of the cylinder 13. In other words, the through-holes 100 consists of, for example, through-holes 101 to 106 at six positions, that is, the through-hole 101 in a topmost portion which has not been closed yet by the piston 25 existing at an extending end in the axial direction of the cylinder 13 to the through-hole 106 in a bottommost portion which is closed by the piston 25 existing at a compressing end.

Accordingly, the hydraulic shock absorber 10 in accordance with the present embodiment carries out the damping action as mentioned below.

(Compression Side Stroke) (Flow of Solid Arrow in FIG. 9A)

If the pressure of the oil in the piston side oil chamber 27A rises, a part of the oil in the piston side oil chamber 27A flows out to the outer flow path 13C through the through-holes 100 (101 to 106) which are provided in the side wall of the inner tube 13B of the cylinder 13. The other part of the oil in the piston side oil chamber 27A flows out to the extension and compression common flow path 41 after pushing open the compression side damping valve 51 of the compression side flow path 50A of the first base piston 50 of the damping force generating device 40 so as to generate the compression side damping force. The oil flowing out to the extension and compression common flow path 41 as mentioned above is separated into two parts in the compression side flow path 60B of the second base piston 60. One oil flows out to the rod side oil chamber 27B from the compression side check valve 52 of the compression side flow path 60B of the second base piston 60 through the extension and compression common flow path 42, the hole-like flow path 60C of the second base piston 60, the outer flow path 13C of the cylinder 13, and the extension and compression common flow path 43. Another oil is discharged to the oil reservoir chamber 32 from the communication passage 44 of the second base piston 60. Another oil discharged to the oil reservoir chamber 32 compensates for the oil at the forward moving volumetric capacity of the piston rod 14.

As the piston rod 14 moves forward to the far side of the oil chamber 27 of the cylinder 13, and the piston 25 provided in the piston rod 14 passes through each of the through-holes 100 which are provided in the side wall of the inner tube 13B of the cylinder 13, in this compression side stroke, the communication by the through-holes 100 between the piston side oil chamber 27A and the outer flow path 13C, and the rod side oil chamber 27B is shut off. As a result, the through-holes 100 which directly communicate the piston side oil chamber 27A with the outer flow path 13C are reduced. Accordingly, the amount of oil flowing out to the outer flow path 13C and the rod side oil chamber 27B from the piston side oil chamber 27A through the through-holes 100 which are still communicated with the oil chamber 27A is reduced gradually due to the pressure application which the piston 25 applies to the piston side oil chamber 27A. In other words, the oil passing through the compression side damping valve 51 of the damping force generating device 40 is increased gradually, and the compression side damping valve 51 generates a greater damping force.

(Extension Side Stroke) (Flow of Solid Arrow in FIG. 9B)

If the pressure of the oil in the rod side oil chamber 27B rises, a part of the oil in the rod side oil chamber 27B flows into the piston side oil chamber 27A from the extension and compression common flow path 43 and the outer flow path 13C of the cylinder 13 through the through-holes 100 (101 to 106) which are provided in the side wall of the inner tube 13B of the cylinder 13. The other part of the oil in the rod side oil chamber 27B flows into the hole-like flow path 60C of the second base piston 60 of the damping force generating device 40 and the extension and compression common flow path 42 through the extension and compression common flow path 43 and the outer flow path 13C of the cylinder 13, and pushes open the extension side damping valve 61 of the extension side flow path 60A of the second base piston 60 so as to generate the extension side damping force. The oil flowing out to the extension and compression common flow path 41 from the extension side damping valve 61 flows out to the piston side oil chamber 27A through the extension side check valve 62 of the extension side flow path 50B of the first base piston 50 after being mixed with the oil which is replenished from the oil reservoir chamber 32 via the communication path 44 of the second base piston 60 and the compression side flow path 60B. The oil replenished from the oil reservoir chamber 32 compensates for the oil at the backward moving volumetric capacity of the piston rod 14.

As the piston rod 14 moves backward from the far side of the oil chamber 27 of the cylinder 13, and the piston 25 provided in the piston rod 14 passes through each of the through-holes 100 which are provided in the side wall of the inner tube 13B of the cylinder 13, in this extension side stroke, the piston side oil chamber 27A and the outer flow path 13C, and the rod side oil chamber 27B are communicated by the through-holes 100. As a result, the through-holes 100 which directly communicate the piston side oil chamber 27A with the outer flow path 13C are increased. Accordingly, a part of the oil in the rod side oil chamber 27B which is pressurized by the piston 25 flows into the piston side oil chamber 27A through the through-holes 100 without passing through the extension side damping valve 61 of the damping force generating device 40 from the outer flow path 13C. The amount of oil passing through the extension side damping valve 61 of the damping force generating device 40 is reduced gradually, and the damping force generated by the extension side damping valve 61 becomes small.

Accordingly, in any of the compression side stroke and the extension side stroke, the damping force is changed according to the strokes, and the position dependency of the damping force is indicated.

The position dependencies of the compression side damping force and the extension side damping force mentioned above in the hydraulic shock absorber 10 are set by selecting the position, the diameter and the number of the through-holes 100.

Therefore, in accordance with the present embodiment, the following operations and effects can be achieved.

(a) As the piston rod 14 moves forward to the far side of the oil chamber 27 of the cylinder 13, and the piston 25 provided in the piston rod 14 passes through the through-hole 100 which is provided in the side wall of the cylinder 13, in the compression side stroke, the communication by the through-hole 100 between the piston side oil chamber 27A and the outer flow path 13C, and the rod side oil chamber 27B is shut off. In accordance with this, the oil passing through the compression side damping valve 51 of the damping force generating device 40 comes to a great quantity due to the pressure application which the piston 25 applies to the piston side oil chamber 27A, and the compression side damping valve 51 generates a great damping force.

On the other hand, in the extension side stroke, as the piston rod 14 moves backward from the far side of the oil chamber 27 of the cylinder 13, and the piston 25 provided in the piston rod 14 passes through the through-hole 100 which is provided in the side wall of the cylinder 13. The piston side oil chamber 27A and the outer flow path 13C are communicated with the rod side oil chamber 27B by the through-hole 100. In accordance with this, a part of the oil in the rod side oil chamber 27B which is pressurized by the piston 25 flows into the piston side oil chamber 27A while passing through the through-hole 100 without passing through the compression side damping valve 51 of the damping force generating device 40 from the outer flow path 13C. An amount of the oil passing through the extension side damping valve 61 of the damping force generating device 40 is reduced, and the damping force generated by the extension side damping valve 61 becomes small.

Accordingly, in any of the compression side stroke and the extension side stroke, the damping force is changed according to the strokes, and the position dependency of the damping force is indicated.

At this time, the damping forces generated by the compression side damping valve 51 and the extension side damping valve 61 of the damping force generating device 40 according to the strokes of the compression side stroke and the extension side stroke are based on the amount of the oil passing through the compression side damping valve 51 and the extension side damping valve 61. The amount of the oil passing through the compression side damping valve 51 and the extension side damping valve 61 depends on a total area of the piston 25 which moves forward to and backward from the cylinder 13 so as to pressurize the piston side oil chamber 27A and the rod side oil chamber 27B, and is relatively large. Accordingly, it is possible to easily increase the damping force generated by the compression side damping valve 51 and the extension side damping valve 61 provided in the damping force generating device 40, and it is possible to obtain a great change of the damping force according to the stroke by the compression side damping valve 51 and the extension side damping valve 61.

(b) The through-holes 100 provided in the side wall of the cylinder 13 are provided at a plurality of positions which are along the axial direction of the cylinder 13.

Therefore, as the piston rod 14 moves forward to the far side of the oil chamber 27 of the cylinder 13, and the piston 25 provided in the piston rod 14 passes through each of the through-holes 100 which are provided in the side wall of the cylinder 13, in the compression side stroke, the communication by the through-hole 100 between the piston side oil chamber 27A and the outer flow path 13C, and the rod side oil chamber 27B is shut off. As a result, the through-holes 100 which directly communicate the piston side oil chamber 27A with the outer flow path 13C are reduced. In accordance with this, the amount of the oil flowing out to the outer flow path 13C and the rod side oil chamber 27B from the piston side oil chamber 27A through the through-hole 100 which is still communicated with the oil chamber is reduced gradually due to the pressure application which the piston 25 applies to the piston side oil chamber 27A. In other words, the oil passing through the compression side damping valve 51 of the damping force generating device 40 grows to a large quantity gradually, and the compression side damping valve 51 generates a great damping force.

Further, in the extension side stroke, as the piston rod 14 moves backward from the far side of the oil chamber 27 of the cylinder 13, and the piston 25 provided in the piston rod 14 passes through each of the through-holes 100 which are provided in the side wall of the cylinder 13, the piston side oil chamber 27A and the outer flow path 13C are communicated with the rod side oil chamber 27B by the through-holes 100. As a result, the through-holes 100 which directly communicate the piston side oil chamber 27A with the outer flow path 13C are increased. In accordance with this, a part of the oil in the rod side oil chamber 27B which is pressurized by the piston 25 flows into the piston side oil chamber 27A from the outer flow path 13C while passing through the through-holes 100 without passing through the extension side damping valve 61 of the damping force generating device 40. The amount of the oil passing through the extension side damping valve 61 of the damping force generating device 40 is reduced gradually, and the damping force generated by the extension side damping valve 61 becomes small.

Therefore, in any of the compression side stroke and the extension side stroke, the damping force is smoothly changed gradually according to the strokes, and the position dependency of the damping force is indicated.

In this case, in the hydraulic shock absorber 10 in accordance with the second embodiment, the through-hole 100 provided in the side wall of the inner tube 13B of the cylinder 13 may be provided at a single position which is along the axial direction of the cylinder 13.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

In accordance with the present invention, there is provided a hydraulic shock absorber comprising: a cylinder, a piston rod, a piston, and an oil reservoir chamber. The cylinder attached to one of a vehicle body side and an axle side. The piston rod is attached to the other of the vehicle body side and the axle side and is inserted into an oil chamber of the cylinder. The piston is provided in a leading end portion of the piston rod and divides the oil chamber of the cylinder into a piston side oil chamber and a rod side oil chamber. The oil reservoir chamber compensates a volumetric capacity of the piston rod moving forward and backward to the oil chamber of the cylinder, the oil reservoir chamber being communicated with the oil chamber of the cylinder. A damping force generating device is provided between the piston side oil chamber and the rod side oil chamber of the cylinder. The damping force generating device is provided with a compression side flow path which circulates the oil in the piston side oil chamber of the cylinder from an outer flow path of the cylinder toward the rod side oil chamber in a compression side stroke. A compression side damping valve is provided in an upstream side of the compression side flow path, and a compression side check valve is provided in a downstream side. An intermediate portion between the compression side damping valve and the compression side check valve in the compression side flow path is communicated with the oil reservoir chamber. The damping force generating device is provided with an extension side flow path which circulates the oil in the rod side oil chamber of the cylinder from the outer flow path of the cylinder toward the piston side oil chamber in an extension side stroke. An extension side damping valve is provided in an upstream side of the extension side flow path, and an extension side check valve is provided in a downstream side. An intermediate portion between the extension side damping valve and the extension side check valve in the extension side flow path is communicated with the oil reservoir chamber. The damping force generating device is provided with a through-hole which communicates the piston side oil chamber of the cylinder with the rod side oil chamber of the cylinder via the outer flow path of the cylinder. A leading end portion of the piston rod is provided with a needle capable of coming in and out of the through-hole of the damping force generating device. An opening degree of the through-hole is variable by the needle according to a forward and backward position of the piston rod with respect to the oil chamber of the cylinder. Accordingly, in a hydraulic shock absorber, it is possible to apply a position dependency to a damping force generated by a compression side damping valve or an extension side damping valve of a damping force generating device, to stably increase the damping force generated by the compression side damping valve or the extension side damping valve easily, and to increase a change of the damping force according to a compression side stroke or an extension side stroke of the damping force.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A hydraulic shock absorber comprising:
a cylinder attached to one of a vehicle body side and an axle side;
a piston rod attached to the other of the vehicle body side and the axe side and inserted into an oil chamber of the cylinder;
a piston which is provided in a leading end portion of the piston rod and divides the oil chamber of the cylinder into a piston side oil chamber and a rod side oil chamber; and
an oil reservoir chamber compensating a volumetric capacity of the piston rod moving forward and backward to the oil chamber of the cylinder, the oil reservoir chamber being communicated with the oil chamber of the cylinder,
wherein a damping force generating device is provided between the piston side oil chamber and the rod side oil chamber of the cylinder,
the damping force generating device is provided with a compression side flow path which circulates the oil in the piston side oil chamber of the cylinder from an outer flow path of the cylinder toward the rod side oil chamber in a compression side stroke, a compression side damping valve is provided in an upstream side of the compression side flow path, a compression side check valve is provided in a downstream side, and an intermediate portion between the compression side damping valve and the compression side check valve in the compression side flow path is communicated with the oil reservoir chamber, the damping force generating device is provided with an extension side flow path which circulates the oil in the rod side oil chamber of the cylinder from the outer flow path of the cylinder toward the piston side oil chamber in an extension side stroke, an extension side damping valve is provided in an upstream side of the extension side flow path, an extension side check valve is provided in a downstream side, and an intermediate portion between the extension side damping valve and the extension side check valve in the extension side flow path is communicated with the oil reservoir chamber, and the damping force generating device is provided with a through-hole which communicates the piston side oil chamber of the cylinder with the rod side oil chamber of the cylinder via the outer flow path of the cylinder, a leading end portion of the piston rod is provided with a needle capable of coming in and out of the through-hole of the damping force generating device, and an opening degree of the through-hole is variable by the needle according to a forward and backward position of the piston rod with respect to the oil chamber of the cylinder,
the damping force generating device is fixedly provided with first and second base pistons around a bolt,
the first base piston is provided with a compression side flow path which is opened and closed by the compression side damping valve, and an extension side flow path which is opened and closed by the extension side check valve,
the second base piston is provided with a compression side flow path which is opened and closed by the compression side check valve, and an extension side flow path which is opened and closed by the extension side damping valve, and
the bolt is provided with the through-hole,
wherein the cylinder consists of an outer tube and an inner tube, and
the damping force generating device is embedded by being inserted and attached into an inner periphery of each of lower ends of the outer tube and the inner tube of the cylinder, to form a valve unit in which the first and second base pistons are fixedly provided around the bolt.

2. The hydraulic shock absorber according to claim 1, wherein the valve unit of the damping force generating device comprises the compression side check valve, the second base piston, the extension side damping valve, a valve stopper, the compression side damping valve, the first base piston, the extension side check valve, and another valve stopper, the compression side check valve, the second base piston, the extension side damping valve, a valve stopper, the compression side damping valve, the first base piston, the extension side check valve, and another valve stopper being disposed on an outer periphery of a rod-shaped thread portion of the bolt, and being immobilized by a nut which is screwed onto the rod-shaped thread portion.

3. The hydraulic shock absorber according to claim 2, wherein the through-hole is provided in the bolt which is arranged and constructed as an element of the valve unit of the damping force generating device,
the through-hole comprises:
a vertical hole which is pierced on a center axis of the rod-shaped thread portion of the bolt from an opposite side to the head portion and is formed so as to be open in one end and be closed in another end;
a transverse hole which is pierced in a radial direction from the vertical hole in the rod-shaped thread portion of the bolt;
an annular groove which is provided in an inner periphery of the valve stopper fitted around the rod-shaped thread portion of the bolt and is communicated with the transverse hole; and
a radial hole which is pierced in a radial direction from the annular groove in the valve stopper.

4. The hydraulic shock absorber according to claim 3, wherein the needle protrudes so as to form a taper shape reduced in diameter gradually toward a leading end side on a center axis of the piston rod, enters the vertical hole of the through-hole as the piston rod goes into a far side of the oil chamber of the cylinder in the compression side stroke, and varies an opening degree of the through-hole based on a change of an area of an annular flow path which the leading end taper portion forms with respect to the vertical hole.

5. A hydraulic shock absorber comprising according to claim 1, wherein the cylinder consists of the outer tube and the inner tube,
the cylinder is inserted and fitted into an inner portion of a damper tube so as to form a damper case,
the damper case is a triple tube construction in which the damper tube, the outer tube and the inner tube of the cylinder are coaxially arranged,
an oil reservoir chamber is formed in an annular gap between the damper tube and the outer tube.

6. A hydraulic shock absorber comprising according to claim 2, wherein the cylinder consists of the outer tube and the inner tube,
the cylinder is inserted and fitted into an inner portion of a damper tube so as to form a damper case,
the damper case is a triple tube construction in which the damper tube, the outer tube and the inner tube of the cylinder are coaxially arranged,
an oil reservoir chamber is formed in an annular gap between the damper tube and the outer tube.

7. A hydraulic shock absorber comprising according to claim 3, wherein the cylinder consists of the outer tube and the inner tube,
- the cylinder is inserted and fitted into an inner portion of a damper tube so as to form a damper case,
- the damper case is a triple tube construction in which the damper tube, the outer tube and the inner tube of the cylinder are coaxially arranged,
- an oil reservoir chamber is formed in an annular gap between the damper tube and the outer tube.

8. A hydraulic shock absorber comprising according to claim 4, wherein the cylinder consists of the outer tube and the inner tube,
- the cylinder is inserted and fitted into an inner portion of a damper tube so as to form a damper case,
- the damper case is a triple tube construction in which the damper tube, the outer tube and the inner tube of the cylinder are coaxially arranged,
- an oil reservoir chamber is formed in an annular gap between the damper tube and the outer tube.

\* \* \* \* \*